United States Patent
Ge et al.

(10) Patent No.: US 9,753,293 B2
(45) Date of Patent: *Sep. 5, 2017

(54) THREE-DIMENSIONAL (3D) DISPLAY APPARATUS AND SYSTEM COMPRISING A TWO-DIMENSIONAL (2D) DISPLAY TERMINAL, LIGHT-SPLITTING DEVICE, AND TRANSFLECTIVE DEVICE

(71) Applicant: TRONXYZ TECHNOLOGY CO., LTD., Shenzhen (CN)

(72) Inventors: Zhang Ge, Shenzhen (CN); Lei Song, Shenzhen (CN); Jingwen Lai, Shenzhen (CN); Lin Chen, Shenzhen (CN)

(73) Assignee: TRONXYZ TECHNOLOGY CO., LTD., Shenzhen (CN)

( * ) Notice: Subject to any disclaimer, the term of this patent is extended or adjusted under 35 U.S.C. 154(b) by 158 days.

This patent is subject to a terminal disclaimer.

(21) Appl. No.: 14/585,880

(22) Filed: Dec. 30, 2014

(65) Prior Publication Data

US 2015/0268477 A1  Sep. 24, 2015

(30) Foreign Application Priority Data

Mar. 20, 2014 (CN) .......................... 2014 1 0105747
Jun. 11, 2014 (CN) .......................... 2014 1 0258175

(51) Int. Cl.
H04N 13/04 (2006.01)
G02B 27/22 (2006.01)

(52) U.S. Cl.
CPC ..... *G02B 27/2214* (2013.01); *H04N 13/0404* (2013.01); *H04N 13/0409* (2013.01);
(Continued)

(58) Field of Classification Search
CPC ............... G02B 27/2214; H04N 13/00; H04N 13/0468; H04N 13/0475; H04N 13/0477; H04N 13/0481
See application file for complete search history.

(56) References Cited

U.S. PATENT DOCUMENTS 6,481,851 B1 * 11/2002 McNelley .......... G02B 27/2292
345/5
9,494,813 B2 * 11/2016 Ge .................... G02F 1/133308
(Continued)

FOREIGN PATENT DOCUMENTS

CN 101382660 A 3/2009
CN 102098524 A 6/2011
(Continued)

OTHER PUBLICATIONS

The State Intellectual Property Office of the People's Republic of China (SIPO) Office Action 1 for 201410258175.2 Dec. 22, 2015.

*Primary Examiner* — Paul Lee
(74) *Attorney, Agent, or Firm* — Anova Law Group, PLLC

(57) ABSTRACT

A display apparatus is provided. The display apparatus includes a supporting member having a containment structure configured to contain a two-dimensional (2D) display terminal for displaying a parallax image. The display apparatus also includes a transflective device configured to face a display surface of the 2D display terminal and to transmit and reflect light from the displayed parallax image. Further, the display apparatus includes a connecting mechanism configured to connect the supporting member with the transflective device, wherein the containment structure includes an installation part configured to install a light-splitting device; an area of the light-splitting device is greater than or equal to an area of the display surface; and a three-dimensional (3D) image to be viewed is formed after
(Continued)

the light from the parallax image displayed by the 2D display terminal is separated by the light-splitting device and transmitted and reflected by the transflective device.

22 Claims, 19 Drawing Sheets

(52) U.S. Cl.
CPC ..... *H04N 13/0454* (2013.01); *H04N 13/0459* (2013.01); *H04N 13/0468* (2013.01); *H04N 13/0497* (2013.01); *H04N 13/0475* (2013.01); *H04N 13/0477* (2013.01); *H04N 13/0481* (2013.01); *H04N 2213/001* (2013.01)

(56) References Cited

U.S. PATENT DOCUMENTS

| | | | |
|---|---|---|---|
| 2007/0115202 A1* | 5/2007 | Kiesenhofer | G06F 1/1616 345/1.1 |
| 2009/0174827 A1* | 7/2009 | Kim | G02B 27/2207 349/15 |
| 2012/0087078 A1* | 4/2012 | Medica | H02J 7/0054 361/679.31 |
| 2012/0200806 A1* | 8/2012 | Inoue | G02B 27/2214 349/62 |
| 2012/0281158 A1* | 11/2012 | Chen | G02F 1/133308 349/15 |

FOREIGN PATENT DOCUMENTS

| | | |
|---|---|---|
| CN | 102540485 A | 7/2012 |
| DE | 202011052517 U1 | 4/2012 |

* cited by examiner

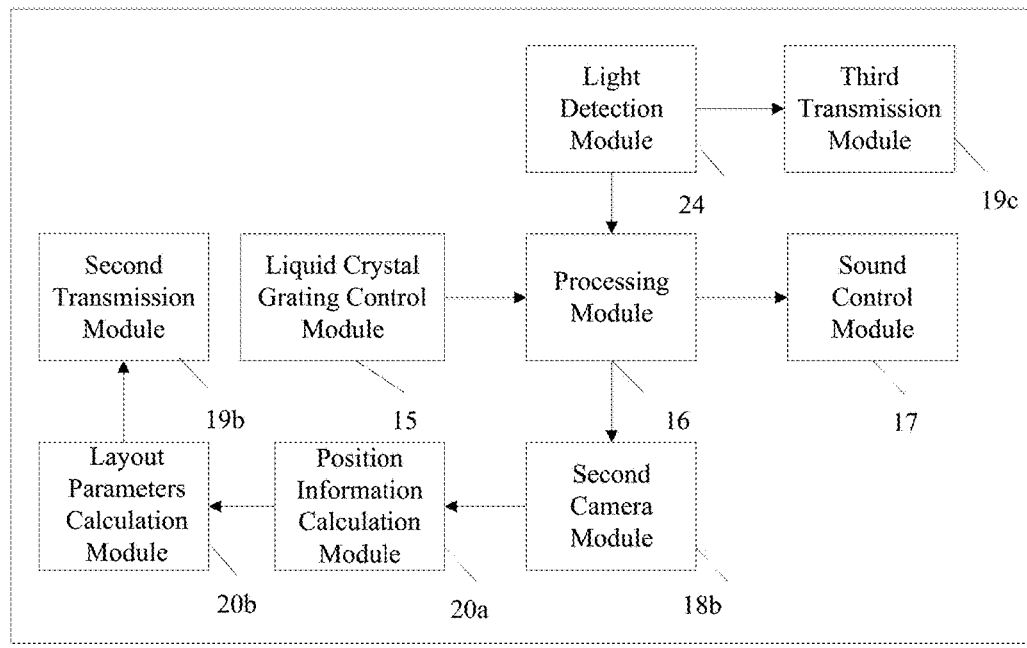
FIG. 17
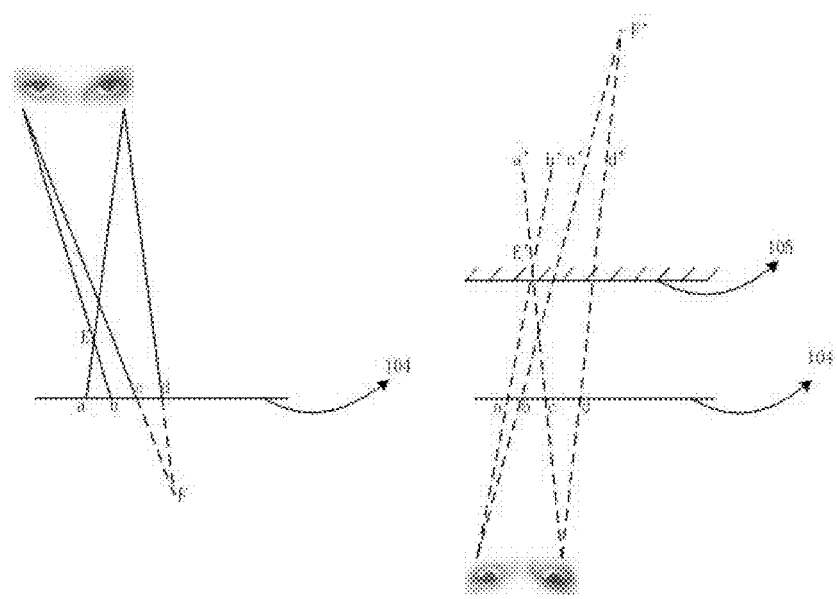
FIG. 18a  FIG. 18b

THREE-DIMENSIONAL (3D) DISPLAY APPARATUS AND SYSTEM COMPRISING A TWO-DIMENSIONAL (2D) DISPLAY TERMINAL, LIGHT-SPLITTING DEVICE, AND TRANSFLECTIVE DEVICE

CROSS-REFERENCES TO RELATED APPLICATIONS

This application claims the priority of Chinese patent application number 201410258175.2 filed on Jun. 11, 2014, and Chinese patent application number 201410105747.3 filed on Mar. 20, 2014, the entire contents of all of which are incorporated herein by reference.

FIELD OF THE INVENTION

The present invention generally relates to the fields of display technologies and, more particularly, to display apparatuses and systems.

BACKGROUND

In existing display technologies, when a display apparatus displays an image, the display mode of the display apparatus is to display the image directly on a display screen of the display apparatus. The image displayed by this kind of display mode is inevitably restricted by the display screen. Therefore, the image is felt artificial and is unable to provide a natural feeling for a viewer. Specially, when a three dimensional (3D) image is restricted by the display screen, the viewer may have a sense of oppression, thereby significantly reducing fidelity of the 3D image. For example, when a 3D roadway extending to the front of the screen is displayed, because the image is restricted by the display screen, the viewer may have a visual feeling that the road is broken and cannot be extended forward, reducing the fidelity of the 3D image. Further, it is easy for such display to form a sense of visual vertigo to cause the viewer to have feeling of visual fatigue, affecting the visual experience of the 3D image.

The disclosed apparatuses and systems are directed to solve one or more problems set forth above and other problems.

BRIEF SUMMARY OF THE DISCLOSURE

One aspect of the present disclosure includes a display apparatus. The display apparatus includes a supporting member having a containment structure configured to contain a two-dimensional (2D) display terminal for displaying a parallax image. The display apparatus also includes a transflective device configured to face a display surface of the 2D display terminal and to transmit and reflect light from the displayed parallax image. Further, the display apparatus includes a connecting mechanism configured to connect the supporting member with the transflective device, wherein the containment structure includes an installation part configured to install a light-splitting device; an area of the light-splitting device is greater than or equal to an area of the display surface; and a three-dimensional (3D) image to be viewed is formed after the light from the parallax image displayed by the 2D display terminal is separated by the light-splitting device and transmitted and reflected by the transflective device.

Another aspect of the present disclosure includes a display system. The system includes a two-dimensional (2D) display terminal for displaying a parallax image and a display apparatus. The display apparatus includes a supporting member, a transflective device, and a connecting mechanism configured to connect the supporting member with the transflective device. The supporting member has a containment structure configured to contain the 2D display terminal for displaying the parallax image. The transflective device is configured to face a display surface of the 2D display terminal and to transmit and reflect light from the displayed parallax image. The containment structure includes an installation part configured to install a light-splitting device; an area of the light-splitting device is greater than or equal to an area of the display surface of the 2D display terminal; and a three-dimensional (3D) image to be viewed is formed after the light from the parallax image displayed by the 2D display terminal is separated by the light-splitting device and transmitted and reflected by the transflective device.

Other aspects of the present disclosure can be understood by those skilled in the art in light of the description, the claims, and the drawings of the present disclosure.

BRIEF DESCRIPTION OF THE DRAWINGS

In order to describe the technical solution of the embodiments of the present invention more clearly, drawings used in the description of the embodiments are introduced below. The drawings described below are merely exemplary embodiments of the present invention. For those skilled in the art, on the premise of no inventive effort being involved, other drawings may also be obtained according to these drawings and the descriptions included herein.

FIG. 17 illustrates a block diagram of an exemplary electric circuitry of another display apparatus consistent with the disclosed embodiments;

FIG. 18a illustrates a schematic diagram of an imaging principle of a current autostereoscopic display apparatus;

FIG. 18b illustrates a schematic diagram of an imaging principle of a display apparatus consistent with the disclosed embodiments;

DETAILED DESCRIPTION

Figure 1:
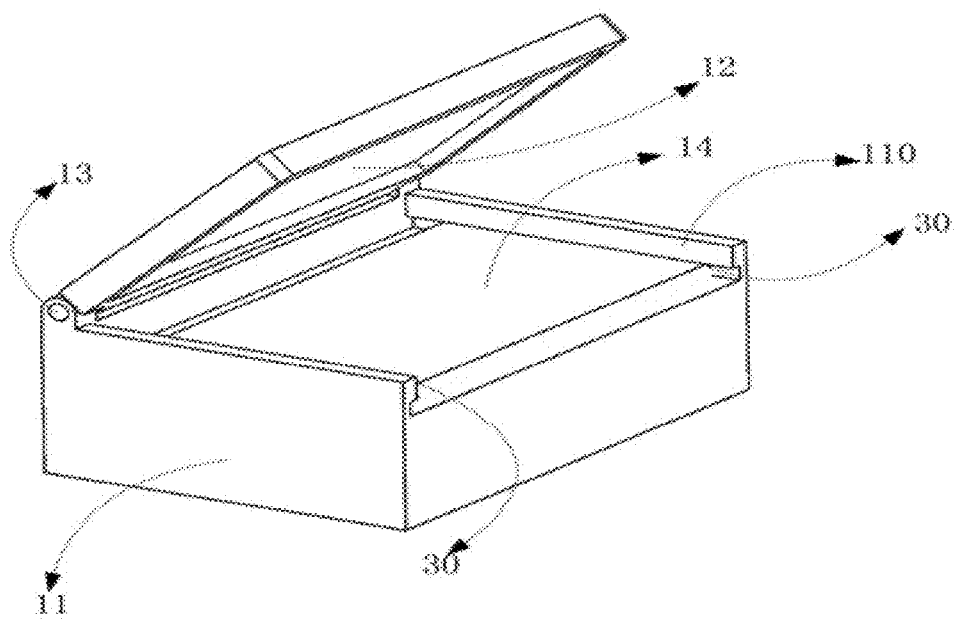
FIG. 1 illustrates a schematic diagram of an exemplary mechanical structure of a display apparatus consistent with the disclosed embodiments.

In the following description, for purposes of illustration, many specific details are illustrated in order to provide a full understanding of one or more embodiments. However, obviously, those embodiments can also be implemented in the case of these specific details changed, replaced, or alternated. The followings, together with accompanying drawings, describe in detail certain embodiments of the present invention. The drawings may reuse certain reference numbers to illustrate different features of disclosed embodiments.

According to disclosed embodiments, a display apparatus includes a mechanical structure portion and a circuitry structure portion. FIGS. 1-12 show exemplary mechanical structures of the display apparatus. FIGS. 13-21 show exemplary circuitry structures of the display apparatus. It should be understood that any of the mechanical structures shown in FIGS. 1-12 can be combined with any of the circuitry structures shown in FIGS. 13-21.

The electronic display apparatus (also called display apparatus) includes a supporting member, a transflective device, and a connecting mechanism. The supporting member connects to the transflective device via the connecting mechanism. The transflective device may be transmissive as well as reflective to incident light.

A containment structure that contains a two dimensional (2D) display terminal is disposed on the supporting member. The containment structure has an installation part which is configured to install a light-splitting device. The area of the light-splitting device is greater than or equal to the area of the display surface of the 2D display terminal, such that the light of parallax image displayed on the 2D display terminal can form a complete three dimensional (3D) image under the action of the light-splitting device.

The 2D display terminal may be a terminal device that displays 2D images, for example, a mobile communication terminal, a tablet personal computer (PC) or other terminals with a display function. The light-splitting device may be a slit grating, a lens grating, etc., wherein the slit grating may include any liquid crystal slit grating, and the lens grating may include any liquid crystal lens grating.

The transflective device is set to face the display surface of the 2D display terminal. The purpose of this setting is to ensure that the light of the parallax image displayed on the 2D display terminal can reach the transflective device.

When the display apparatus displays an image, the 2D display terminal is placed in the containment structure of the display apparatus. The light of the parallax image displayed on the 2D display terminal, under the action of the light-splitting device and the transflective device, can form a 3D image for the viewer. The 3D image is actually a virtual image. Comparing to an image displayed on a traditional display apparatus, when the viewer views the image displayed by the 2D display terminal, because the 3D virtual image is not displayed directly by a display screen of the display apparatus, the viewer can gain a new viewing experience. Also, the 3D image formed by the display apparatus is suspended in realistic three-dimensional space, the display effect of the 3D image is more realistic, providing a better viewing experience for the viewer. In addition, the display apparatus in the present disclosure can realize realistic 3D image display through the simple supporting member, the transflective device and the connecting mechanism, which allows for more realistic display effect of the 3D image without complex operations for position matching of the image and the optical device and precise alignment of the image and the optical device.

Further, the projected area of the transflective device on the plane which the 2D display terminal is located at may be greater than or equal to the display area of the display surface of the 2D display terminal, such that the light of the parallax image displayed on the 2D display terminal can form a complete 3D image under the action of the transflective device.

Moreover, when the connecting mechanism that connects the supporting member and the transflective device is a transparent body, the viewer does not see any border when viewing the 3D virtual image. That is, the 3D image is not restricted by any display border. Thus, the display apparatus can realize the display without borders, avoiding causing vertigo and depressive feelings and thereby improving the viewer's visual experience.

Further, a certain distance exists between the connecting mechanism and the virtual 3D image a depth direction of the virtual image, so the restriction of the screen border in the existing technology can be reduced to some extent, thereby reducing the vertigo feeling of the viewer.

In addition, when the rear space of the formed virtual image is an open space or transparent space, real objects and the virtual image in the space can all come into the viewer's eyes through the transflective device, thereby forming a display effect of a combination of virtuality and reality, further improving the fidelity of the 3D image.

The supporting member may include an upper supporting member and a lower supporting member. The containment structure is disposed on the upper supporting member. The connecting mechanism connects the upper supporting member and the lower supporting member. The transflective device is disposed between the upper supporting member and the lower supporting member. An angle between the display surface of the 2D display terminal and a facing surface of the transflective device may be an acute angle, wherein the facing surface is the surface of the transflective device that faces to the 2D display terminal.

Specifically, when the transflective device is disposed between the upper supporting member and the lower supporting member, there are many configuration modes. According to a position relationship between the transflective device and the connecting mechanism, the configuration modes can be divided into two categories: one category is that the transflective device and the connecting mechanism are integrated together; the other category is that the transflective device and the connecting mechanism are separated. The details of the configuration modes are described in the followings.

In the first category of the configuration mode, the transflective device and the connecting mechanism are integrated together. The connecting mechanism includes a first connecting unit and a second connecting unit that are configured face to face. The first connecting unit, the second connecting unit, the upper supporting member and the lower supporting member form a containing space for containing the transflective device. The transflective device can be placed in the containing space through a slider/groove mechanism. Specifically, the transflective device may be mounted in the containing space through holding grooves of the upper supporting member and the lower supporting member. The transflective device may also be mounted in the containing space through holding grooves of the first connecting unit and the second connecting unit. Of course, the transflective device may also be mounted in the containing space through the holding grooves of the upper supporting member, the lower supporting member, the first connecting unit and the second connecting unit. The upper supporting member includes a first end and a second end facing the first end. The lower supporting member includes a first end and a second end facing the first end. The first end of the upper supporting member and the first end of the lower supporting member are on the same side.

This first category of configuration mode includes the following specific configuration modes.

The first configuration mode is that one end of the first connecting unit and one end of the second connecting unit connect respectively to the first end of the upper supporting member, while the other end of the first connecting unit and the other end of the second connecting unit connect respectively to the first end of the lower supporting member.

The second configuration mode is that one end of the first connecting unit and one end of the second connecting unit connect respectively to the second end of the upper supporting member, while the other end of the first connecting unit and the other end of the second connecting unit connect respectively to the second end of the lower supporting member.

The third configuration mode is that one end of the first connecting unit and one end of the second connecting unit connect respectively to the first end of the upper supporting member, while the other end of the first connecting unit and the other end of the second connecting unit connect respectively to the second end of the lower supporting member. At this time, the shape of the display apparatus resembles a "Z" shape, which has a desired appearance.

The fourth configuration mode is that one end of the first connecting unit and one end of the second connecting unit connect respectively to the second end of the upper supporting member, while the other end of the first connecting unit and the other end of the second connecting unit connect respectively to the first end of the lower supporting member. At this time, the shape of the display apparatus resembles a reverse "Z" shape, which has a desired appearance.

In the second category of the configuration mode, the transflective device and the connecting mechanism are separated. The connecting mechanism in this category includes a supporting and connecting unit. The upper supporting member includes a first end and a second end facing the first end. The lower supporting member includes a first end and a second end facing the first end. The first end of the upper supporting member and the first end of the lower supporting member are on the same side. A containing space for containing the transflective device is formed between the upper supporting member and the lower supporting member. The transflective device can be placed in the containing space through the slider/groove mechanism. Specifically, the transflective device may be mounted in the containing space through the holding grooves of the upper supporting member and the lower supporting member.

This second category of configuration mode includes the following two specific configuration modes.

The first configuration mode is that one end of the supporting and connecting unit connects to the first end of the upper supporting member, while the other end of the supporting and connecting unit connects to the first end of the lower supporting member. At this point, the transflective device may be mounted in the containing space formed by the upper supporting member and the lower supporting member through the holding groove of the first end of the upper supporting member and the holding groove of the second end of the lower supporting member.

The second configuration mode is that one end of the supporting and connecting unit connects to the second end of the upper supporting member, while the other end of the supporting and connecting unit connects to the second end of the lower supporting member. At this point, the transflective device may be mounted in the containing space formed by the upper supporting member and the lower supporting member through the holding groove of the second end of the upper supporting member and the holding groove of the first end of the lower supporting member.

Further, the configuration mode of the containment structure may also include various structures. For example, in one configuration, the containment structure has a side wall and a first opening portion. A bayonet matching with the holding groove of the 2D display terminal is disposed on the side wall, such that the 2D display terminal is engaged in the containment structure through the first opening portion.

Or, the containment structure has the side wall and a second opening portion disposed on the side wall, such that the 2D display terminal can be slidably mounted in the containment structure through the second opening portion.

Or, the containment structure has the side wall and a top portion. The first opening portion is deposited at the top portion, and the second opening portion is deposited on the side wall, such that the 2D display terminal can be slidably mounted in the containment structure through the second opening portion.

Or, the containment structure has the side wall and a top portion. The first opening portion is deposited at the top portion, and the second opening portion and the bayonet are disposed on the side wall, such that the 2D display terminal can be slidably mounted in the containment structure through the second opening portion or the 2D display terminal is clamped in the containment structure through the first opening portion.

The common purpose of the four configuration modes is to ensure the close connection of the display surface of the 2D display terminal with the light-splitting device, such that the parallax image displayed on the 2D display terminal has a better light-splitting effect after passing the light-splitting device.

In addition, the angle between the display surface of the 2D display terminal and the facing surface of the transflective device is 30-60 degrees. When the angle is 45 degrees, the scale of the 3D virtual image formed by the display apparatus is the same as the scale of the image displayed on the 2D display terminal, further improving the viewer's visual experience.

FIGS. 1-12 shows mechanical structures of the display apparatus. The display apparatus shown in FIGS. 1-2 includes a supporting member 11, a transflective device 12 and a connecting mechanism 13. The supporting member 11 connects to the transflective device 12 via the connecting mechanism 13.

A containment structure 110 which is configured to contain a 2D display terminal is disposed on the supporting member 11. Optionally, the shape of the containment structure 110 matches with the shape of the 2D display terminal. Therefore, when the 2D display terminal is placed in the containment structure 110, the shape of the containment structure 110 and the shape of the 2D display terminal are matched. The 2D display terminal can be fixed or placed in the containment structure 110. The 2D display terminal can also be detachably installed in the containment structure 110. It should be noted that the 2D display terminal refers to any terminal device that displays 2D images, such as a mobile communication terminal, a tablet personal computer (PC). When the 2D display terminal is detachably installed in the containment structure 110, the display apparatus and the 2D display terminal are separated at a physical level. That is, the 2D display terminal exists independently of the display apparatus.

Figure 2:
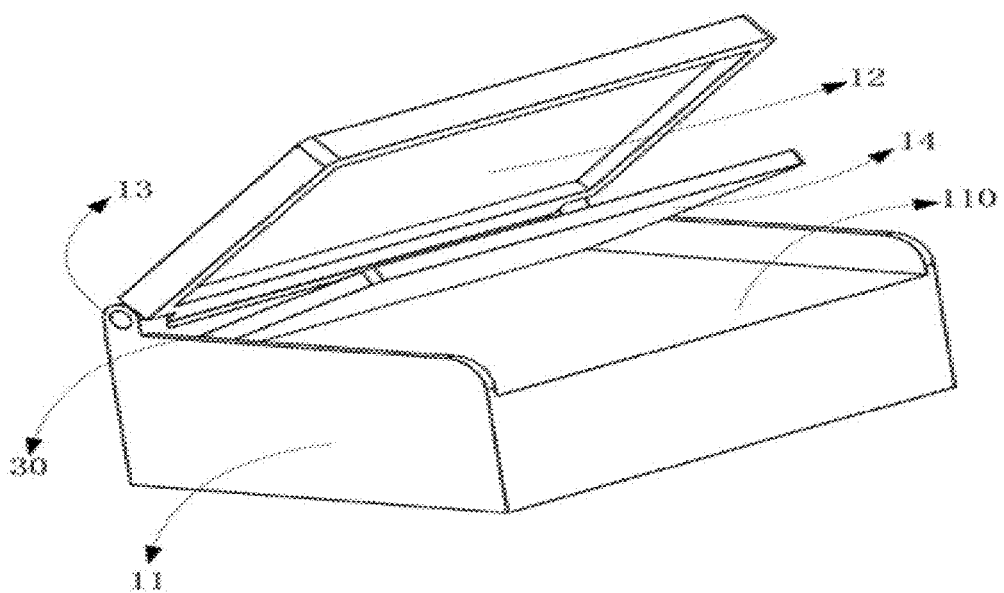
FIG. 2 illustrates a schematic diagram of an exemplary mechanical structure of another display apparatus consistent with the disclosed embodiments.

The containment structure 110 may have an installation part 30 that is configured to install the light-splitting device 14. The light-splitting device is installed on the installation part 30 through a slider/groove mechanism, an adhesive way, or other mechanical fixation ways. Further, the area of the light-splitting device 14 is greater than or equal to the area of the display surface of the 2D display terminal, such that the parallax image displayed on the 2D display terminal can form a complete 3D image under the action of the light-splitting device 14. In principle, when the light-splitting device 14 may be slidably mounted in the installation part 30, the area of the light-splitting device is equal to the area of the display surface of the 2D display terminal; when the light-splitting device 14 is adhered to the installation part 30, the area of the light-splitting device is greater than the area of the display surface of the 2D display terminal. As shown in FIG. 1, the light-splitting device 14 is slidably mounted in the installation part 30. As shown in FIG. 2, the light-splitting device 14 is installed on the installation part 30 through other mechanical fixation ways.

The transflective device 12 may include a transflective member and a fixing member. The fixing member is configured to fix the transflective member. In certain embodiments, the fixing member is made of a transparent material. The transflective member is a device that has a surface coating and whose transmissive/reflecting ratio can be adjusted according to the ambient light. If a power supply is provided, the transflective member may use a liquid crystal glass device (that is, electronically controlled liquid crystal glass). When power is applied, the transmissive rate can be adjusted by adjusting the voltage of the device to adapt to changing light environment.

The transflective device 12 is set to face the display surface of the 2D display terminal. That is, the display surface of the 2D display terminal is set to face the transflective device 12, such that the light of the parallax image displayed on the 2D display terminal can reach the transflective device 12.

It is noted that the transflective device 12 may be configured without any frame or bracket. That is, no frames or brackets are fixed or configured on an edge of the transflective device 12. In this way, 3D images formed in the space formed behind the transflective device are displayed without any frame impression.

When the display apparatus displays the image, the 2D display terminal is placed in the containment structure 11 of the display apparatus. The light of the parallax image displayed on the 2D display terminal, under the action of the light-splitting device 14 and the transflective device 12, can form a 3D image for the viewer. The 3D image is actually a virtual image. The light-splitting device may be a slit grating, a lens grating, etc., wherein the slit grating may include any liquid crystal slit grating, and the lens grating may include any liquid crystal lens grating.

At the same time, in order to ensure that all light of the parallax image displayed on the 2D display terminal can reach the transflective device 12, the projected area of the transflective device 12 on the plane at which the 2D display terminal locates may be greater than or equal to the area of the display surface of the 2D display terminal, such that the light of the parallax image displayed on the 2D display terminal can form a complete 3D image under the action of the transflective device 12. If the projected area of the transflective device 12 on the plane at which the 2D display terminal locates is less than the area of the display surface of the 2D display terminal, the light of the parallax image displayed on the 2D display terminal cannot form a complete 3D image under the action of the transflective device 12, affecting the user's viewing experience.

There are multiple connection relationships between the supporting member 11 and the transflective device 12, provided that the light of the parallax image displayed on the 2D display terminal can form a complete 3D image under the action of the transflective device 12. The basic requirement for the display apparatus to display the images is that the angle between the display surface of the 2D display terminal and the facing surface of the transflective device 12 is less than 90 degrees, wherein the facing surface refers to the surface of the transflective device 12 facing the display surface of the 2D display terminal.

Figure 3:
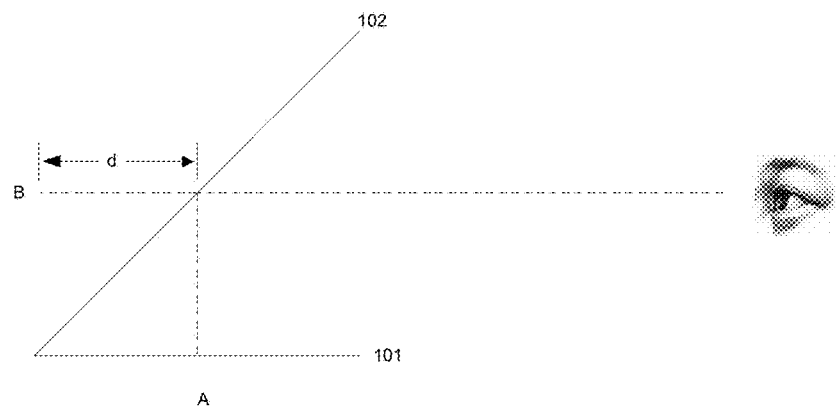
FIG. 3 illustrates a schematic diagram of an exemplary imaging principle by using a display apparatus consistent with the disclosed embodiments.

FIG. 3 illustrates a schematic diagram of an exemplary imaging principle by using a display apparatus consistent with the disclosed embodiments. As shown in FIG. 3, plane 101 is a plane that the 2D display terminal locates at, and plane 102 is a plane that the transflective device 12 locates at.

Point A on a display surface of the 2D display terminal emits the light that represents the signal strength of the point A. The light enters into the viewer's eyes after reflected by the transflective device 12 at plane 102. Because the angle between the display surface of the 2D display terminal and the facing surface of the transflective device 12 is less than 90 degrees, the viewer may see the image of point A at point B behind the transflective device 12.

Because the image at point B is formed after the light is reflected by the transflective device 12, and the display border of the 2D display terminal does not emit the light, the display border of the 2D display terminal does not form the image behind the transflective device 12. When the connecting mechanism is transparent, the 3D image that is viewed by the viewer is not restricted by any border, so as not to cause the viewer vertigo. At the same time, because the transflective device 12 has a light transmission function, in the case of the space behind the transflective device 12 is open or transparent, real objects and the real scene behind the virtual image can also be viewed by the viewer, generating a display effect that the virtual image is superimposed over a real world environment and further improving the viewer's visual experience.

The 3D image viewed by the viewer is formed by the parallax image displayed on the 2D display terminal under the action of the light-splitting device 14 and the transflective device 12, providing a new viewing experience for the viewer. In addition, the 3D image formed by the display apparatus is suspended in real three-dimensional space, and the 3D image is not displayed directly by the display screen of the display apparatus. Therefore, the display effect of the 3D image is more realistic, providing a better visual experience for the viewer. Moreover, the display apparatus in the present disclosure can realize realistic 3D image display through the simple supporting member, the transflective device and the connecting mechanism, which allows for more realistic display effect of the 3D image without complex operations for position matching of the image and the optical device and precise alignment of the image and the optical device.

Further, when the connecting mechanism is transparent, the 3D image viewed by the viewer is not restricted by the border. The display apparatus can display the image without borders, thereby not causing vertigo feelings. In addition, because the transflective device 12 has a light transmission function, in the case of the space behind the transflective device 12 is open or transparent, the real objects and the real scene behind the virtual image can also be viewed by the viewer, generating a display effect that the virtual image is superimposed over the real world environment and improving the viewer's visual experience.

Moreover, the transflective device 12 may use a planar transflective lens which has the same width as the supporting member 11. The transflective device 12 may be a geometric surface without borders, such as a planar, a curved surface. A transmission-to-reflection ratio is adjustable. The size of the geometric surface can be determined based on the size of the viewing image. The transflective device 12 may use material with both transmissive and reflective functions. The transflective device 12 may also use other material (e.g., glass, plastic, acrylic plate) coated with material with both transmissive and reflective functions. The transflective device 12 may also use an electric control transflective screen (e.g., an electric control liquid crystal screen).

Further, the transflective effect of the transflective device 12 is affected obviously by the light illumination. For example, the viewer may see a poorly contrasted image when the viewer views an image at outside under strong light condition. Therefore, the glass used to make the transflective device 12 can be coated with photochromic material or added with photochromic material, wherein the photochromic material is a kind of functional material having the special photochemistry property such as silver halide.

Further, a certain distance exists between the connecting mechanism 13 and the virtual image. Therefore, the screen border restrictions in existing technologies can be reduced to some extent, thereby reducing vertigo feeling of the viewer. For example, when the connecting mechanism 13 and the transflective device 12 are integrated together, the plane where the transflective device 12 locates is the plane where the connecting mechanism 13 locates. As can be seen from FIG. 3, a certain distance d exists between the connecting mechanism 13 and the virtual image point B along the depth direction.

Further, the angle between the display surface of the 2D display terminal and the facing surface of the transflective device 12 is 30-60 degrees. When the angle is 45 degrees, the scale of the 3D virtual image formed by the display apparatus is the same as the scale of the image displayed on the 2D display terminal, further improving the viewer's visual experience. For example, an angle shown in FIG. 1 is 45 degrees.

Further, the connecting mechanism between the supporting member 11 and the transflective device 12 may be a fixed connecting mechanism, or a flexible connecting mechanism. If the flexible connecting mechanism is utilized, on the one hand, the viewer can adjust the angle conveniently according to actual requirements; on the other hand, the connecting mechanism can be superimposed when it is not used, which is more convenient for the viewer to carry the display apparatus. The structure of flexible connection may be realized by the current flexible connecting mechanisms or appropriate transformation, which is not repeated herein.

It should be noted that the supporting member 11 may include an upper supporting member 111 and a lower supporting member 112. The containment structure 110 is disposed on the upper supporting member 111. At this time, the installation part 30 can be disposed at the bottom of the containment structure 110. The light-splitting device 14 may be coupled to the installation part 30 or adhered to the installation part 30. When the light-splitting device 14 is adhered to the installation part 30, the light-splitting device 14 can be adhered to the internal surface or the external surface of the installation part 30.

The connecting mechanism 13 connects the upper supporting member 111 and the lower supporting member 112. The transflective device 12 is configured between the upper supporting member 111 and the lower supporting member 112. The angle between the display surface of the 2D display terminal and the facing surface of the transflective device 12 is an acute angle. The facing surface refers to the surface of the transflective device 12 facing the display surface of the 2D display terminal.

The transflective device 12 is configured between the upper supporting member 111 and the lower supporting member 112. There may be many configuration modes. According to position relationship between the transflective device 12 and the connecting mechanism 13, the configuration modes can be divided into two categories. One category is that the transflective device 12 and the connecting mechanism 13 are integrated together. The other category is that the transflective device 12 and the connecting mechanism 13 are separated.

In the first category of the configuration mode, the transflective device 12 and the connecting mechanism 13 are integrated together. This category may further include the following configuration modes. FIGS. 4 to 7 illustrate structure schematic diagrams of exemplary mechanical structure of display apparatuses consistent with the disclosed embodiments.

The structures of the display apparatuses shown in FIGS. 4-7 are transformed on the basis of the structures of the display apparatuses shown in FIGS. 1-2. The difference between the display apparatus shown in FIGS. 4-7 and that shown in FIGS. 1-2 is that the connecting mechanism of the display apparatus shown in FIGS. 4-7 may include a first connecting unit 131 and a second connecting unit 132.

The first connecting unit 131 and the second connecting unit 132 are configured to face each other. The first connecting unit 131, the second connecting unit 132, the upper supporting member 111 and the lower supporting member 112 together form a containing space for containing the transflective device 12. The transflective device 12 can be disposed in the containing space through a slider/groove or other coupling mechanism. For example, the transflective device 12 may be mounted in the containing space through holding grooves of the first connecting unit 131 and the second connecting unit 132.

The containment structure 110 is disposed on the upper supporting member 111. The installation part 30 is disposed at the bottom of the containment structure 110. The light-splitting device 14 may be coupled to the installation part 30 or adhered to the installation part 30. When the light-splitting device 14 is coupled to the installation part 30, the light-splitting device 14 can be adhered to the internal surface or the external surface of the installation part 30. The upper supporting member 111 includes a first end 111a and a second end 111b facing the first end. The lower supporting member 112 includes a first end 112a and a second end 112b facing the first end. The first end 111a of the upper supporting member 111 and the first end 112a of the lower supporting member 112 are on the same side.

It could be understood that the first connecting unit 131 and the second connecting unit 132 can be made of transparent material, preventing the display effect of 3d images from being affected by the first connecting unit 131 and the second connecting unit 132.

Furthermore, the configurations of the first connecting unit 131 and the second connecting unit 132 can be different. In detail, in certain embodiments, the first connecting unit 131 can be arranged on an upper side of the transflective device 12 adjacent to the first end 111a of the upper supporting member 111, and the second connecting unit 132 can be arranged on a lower side of the transflective device 12 adjacent to the first end 112a of the lower supporting member 112. In this way, the left and right sides of the transflective device 12 are not configured with any connecting unit and thus 3d images can be displayed without any frame impression.

The configuration mode between the upper supporting member, the lower supporting member, and the transflective device may include the followings.

Figure 4:
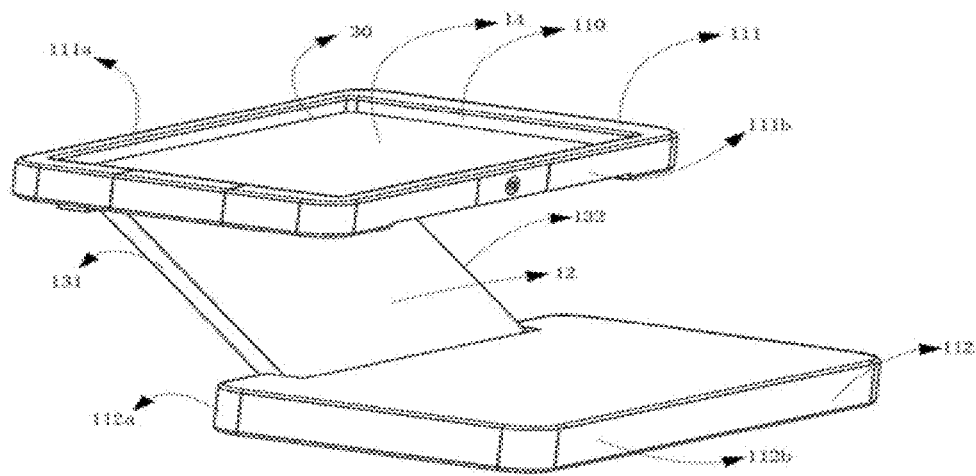
FIG. 4 illustrates a schematic diagram of an exemplary mechanical structure of another display apparatus consistent with the disclosed embodiments.

Under the first configuration mode, one end of the first connecting unit 131 and one end of the second connecting unit 132 connect to the first end 111a of the upper supporting member 111, respectively; the other end of the first connecting unit 131 and the other end of the second connecting unit 132 connect to the first end 112a of the lower supporting member 112, respectively. Thus, the structure shown in FIG. 4 is formed. At this time, the light emitted by the 2D display terminal on the upper supporting member 111, under the action of the light-splitting device 14 and the transflective device 12, forms a 3D virtual image for the viewer.

Figure 5:
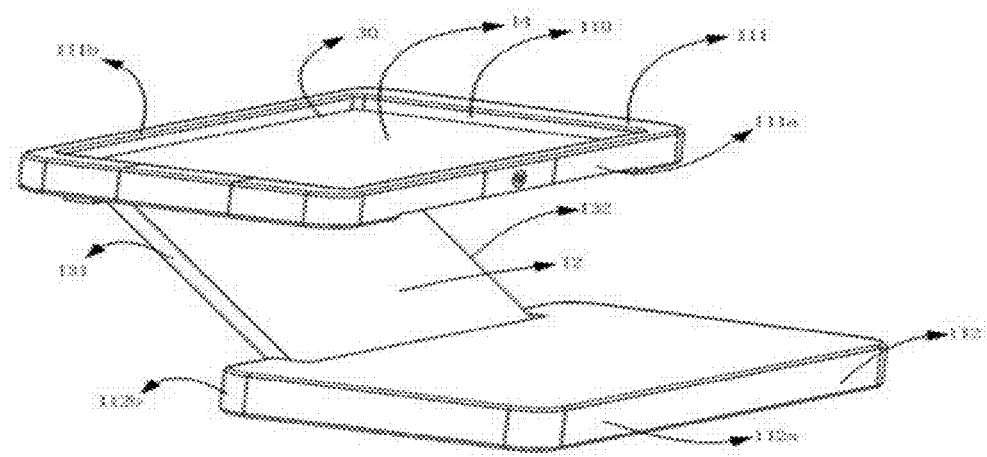
FIG. 5 illustrates a schematic diagram of an exemplary mechanical structure of another display apparatus consistent with the disclosed embodiments.

Under the second configuration mode, one end of the first connecting unit 131 and one end of the second connecting unit 132 connect to the second end 111b of the upper supporting member 111, respectively; the other end of the first connecting unit 131 and the other end of the second connecting unit 132 connect to the second end 112b of the lower supporting member 112, respectively. The structure shown in FIG. 5 is formed. The light emitted by the 2D display terminal on the upper supporting member 111, under the action of the light-splitting device 14 and the transflective device 12, forms a 3D virtual image for the viewer to view.

Figure 6:
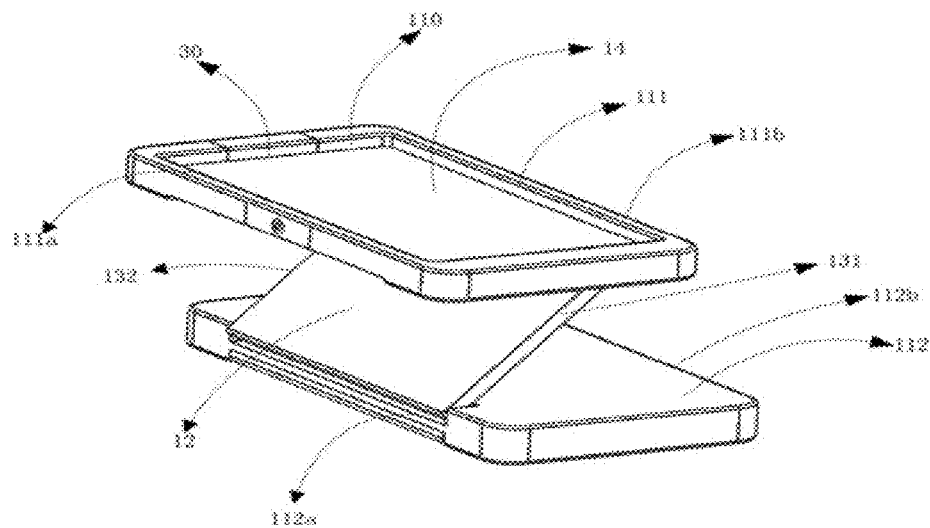
FIG. 6 illustrates a schematic diagram of an exemplary mechanical structure of another display apparatus consistent with the disclosed embodiments.

Under the third configuration mode, one end of the first connecting unit 131 and one end of the second connecting unit 132 connect to the second end 111b of the upper supporting member 111, respectively; the other end of the first connecting unit 131 and the other end of the second connecting unit 132 connect to the first end 112a of the lower supporting member 112, respectively. At this time, the transflective device 12 is at the opposite sides of the upper supporting member 111 and the lower supporting member 112. Thus, the structure shown in FIG. 6 is formed. The light emitted by the 2D display terminal on the upper supporting member 111, under the action of the light-splitting device 14 and the transflective device 12, forms a 3D virtual image for the viewer. The shape of the display apparatus resembles a letter 'Z' and looks beautiful. Also, when the 3D virtual image is displayed through the 7'-shaped display apparatus, the effect is similar to a stage effect, and this may improve the fidelity of the 3D virtual image.

Figure 7:
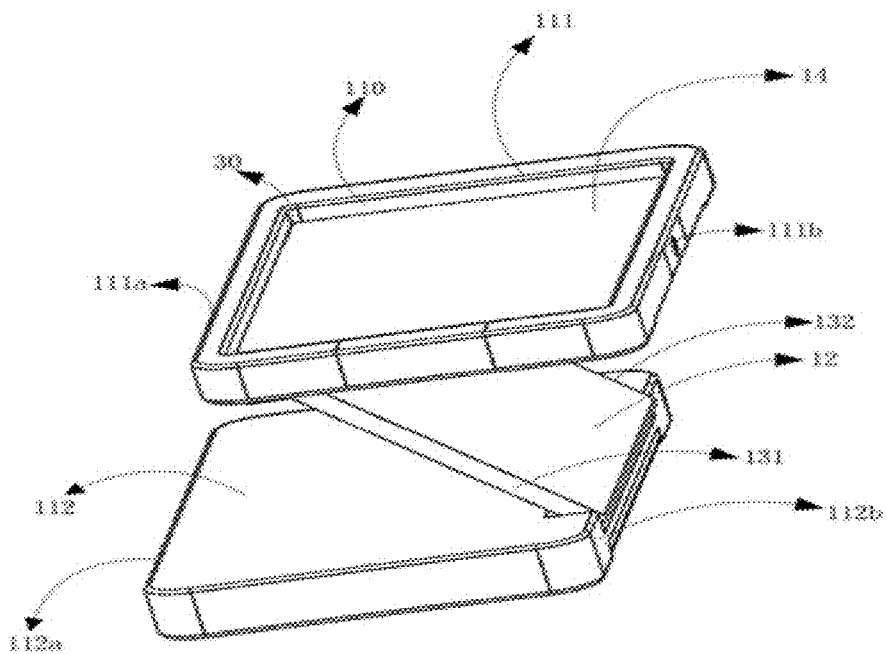
FIG. 7 illustrates a schematic diagram of an exemplary mechanical structure of another display apparatus consistent with the disclosed embodiments.

Under the fourth configuration mode, one end of the first connecting unit 131 and one end of the second connecting unit 132 connect to the first end 111a of the upper supporting member 111, respectively; the other end of the first connecting unit 131 and the other end of the second connecting unit 132 connect to the second end 112b of the lower supporting member 112, respectively. At this time, the upper supporting member 111 and the lower supporting member 112 are located at opposite sides of the transflective device. Thus, the structure shown in FIG. 7 is formed. The light emitted by the 2D display terminal on the upper supporting member 111, under the action of the light-splitting device 14 and the transflective device 12, forms a 3D virtual image for the viewer. The shape of the display apparatus resembles a reverse letter 'Z' and has a desired appearance. Also, when the 3D image is displayed through the reverse 'Z'-shaped display apparatus, the effect is similar to a stage effect, and this may improve the fidelity of the 3D virtual image.

In the above four configuration modes, the angle formed between the display surface of the 2D display terminal on the upper supporting member 111 and the facing surface of the transflective device 12 is less than 90 degrees. Optionally, the angle is 30 to 60 degrees. When the angle is 45 degrees, the scale of the 3D virtual image formed by the display apparatus is the same as the scale of the image displayed on the 2D display terminal, such that the viewer can view the virtual image at the direction parallel to the upper supporting member 111. For example, a 45-degree angle is utilized in FIGS. 4-7.

When the display apparatus displays images using the above four configuration modes, a certain distance exists between the first connecting unit 131, the second connecting unit 132 and the virtual image along a depth direction of the virtual image. Therefore, the screen border restrictions in existing technologies can be reduced to some extent, thereby reducing vertigo feeling of the viewer. Because the connecting mechanism 13 and the transflective device 12 are integrated together, the certain distance exists between the first connecting unit 131, the second connecting unit 132 and the formed virtual image along the depth direction of the virtual image. For example, as seen from FIG. 3, a certain distance d exists along the depth direction between the virtual image point B and the plane of the transflective device 12 along the depth direction of the virtual image. The distance d is also the distance along the depth direction between the first connecting unit 131, the second connecting unit 132, and the formed virtual image.

When the first connecting unit 131 and the second connecting unit 132 connect to the upper supporting member 111 or the lower supporting member 112, a fixed connection (e.g., jam connection) may be used, forming a fixed angle. A flexible connection may also be used. When the flexible connection is used, the viewer can adjust conveniently the angle according to the needs.

When the display apparatus displays the image, the light of the parallax image displayed on the 2D display terminal, under the action of the light-splitting device 14 and the transflective device 12, can form a 3D image for the viewer. Because the 3D image formed by the display apparatus is suspended in real three-dimensional space and is not displayed directly by the display screen, the display effect of the 3D image is more realistic, providing a better viewing experience for the viewer. In addition, when the specific 'Z'-shaped display structure displays the 3D virtual image, the display effect is similar to a stage effect, further improving the fidelity of the 3D virtual image. When both the first connecting unit 131 and the second connecting unit 132 are transparent, the 3D virtual image without border restrictions can be displayed. When the space behind the transflective device is transparent or open, a display effect that the virtual image is superimposed over a real world environment is formed, further improving the viewer's visual experience.

Figure 8:
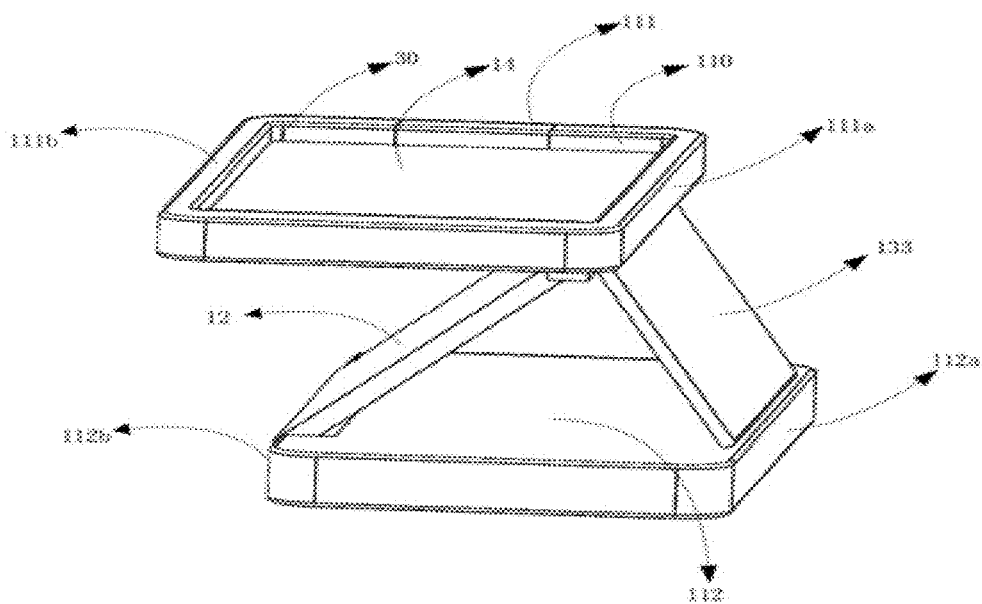
FIG. 8 illustrates a schematic diagram of an exemplary mechanical structure of another display apparatus consistent with the disclosed embodiments.

In the second category of the configuration mode, the transflective device 12 and the connecting mechanism 13 are separated. FIG. 8 illustrates a schematic diagram of an exemplary mechanical structure of another display apparatus consistent with the disclosed embodiments.

As shown in FIG. 8, the structure of the display apparatus is a simple transformation of the structure of the display apparatus shown in FIGS. 1-2. The difference between the display apparatus shown in FIG. 8 and the display apparatus shown in FIGS. 1-2 is that connecting mechanism 13 of the display apparatus shown in FIG. 8 includes a supporting and connecting unit 133.

Further, the containment structure 110 is disposed on the upper supporting member 111. The installation part 30 is disposed at the bottom of the containment structure 110. The upper supporting member 111 includes a first end 111a and a second end 111b facing the first end 111a. The lower supporting member 112 includes a first end 112a and a second end 112b facing the first end 112a. The first end 111a of the upper supporting member 111 and the first end 112a of the lower supporting member 112 are on the same side. The upper supporting member 111 and the lower supporting member 112 together form a containing space for containing the transflective device 12. The transflective device 12 can be disposed in the containing space through a clamping way. Specifically, the transflective device 12 may be clamped in the containing space through holding grooves of the upper supporting member and the lower supporting member.

At this time, the configuration modes of the upper supporting member, the lower supporting member, the supporting and connecting unit 133 and the transflective device 12 may include the followings.

The first configuration mode: One end of the supporting and connecting unit 133 connects to the first end 111a of the upper supporting member 111; the other end of the supporting and connecting unit 133 connects to the first end 112a of the lower supporting member 112. At this time, the transflective device 12 may be mounted in the containing space formed between the upper supporting member and the lower supporting member through the holding groove of the first end 111a of the upper supporting member 111 and the holding groove of the second end 112b of the lower supporting member 112.

The second configuration mode: One end of the supporting and connecting unit 133 connects to the second end 111b of the upper supporting member 111; the other end of the supporting and connecting unit 133 connects to the second end 112b of the lower supporting member 112. At this time, the transflective device 12 may be mounted in the containing space formed between the upper supporting member and the lower supporting member through the holding groove of the second end 111b of the upper supporting member 111 and the holding groove of the first end 112a of the lower supporting member 112.

Below is an example that uses the first configuration mode. One end of the supporting and connecting unit 133 connects to the first end 111a of the upper supporting member 111; the other end of the supporting and connecting unit 133 connects to the first end 112a of the lower supporting member 112. At this time, the transflective device 12 may be mounted in the containing space formed between the upper supporting member and the lower supporting member through the holding groove of the first end 111a of the upper supporting member 111 and the holding groove of the second end 112b of the lower supporting member 112. Thus, the structure shown in FIG. 8 is formed. The angle between the display surface of the 2D display terminal on the upper supporting member 111 and the facing surface of the transflective device 12 is 45 degrees.

When the display apparatus displays an image, the light of the parallax image displayed on the 2D display terminal, under the action of the light-splitting device 14 and the transflective device 12, can form a 3D image for the viewer. Because the 3D image formed by the display apparatus is suspended in realistic three-dimensional space and is not displayed directly by the display screen, the display effect of the 3D image is more realistic, providing a better viewing experience for the viewer. In addition, when the supporting member 133 is transparent, the 3D virtual image without border restrictions can be displayed. When the space behind the transflective device is transparent or open, a display effect that the virtual image is superimposed over the real world environment is formed, further improving the viewer's visual experience.

FIGS. 9-12 illustrate structure schematic diagrams of exemplary containment structure on the supporting member consistent with the disclosed embodiments. It should be noted that the containment structure shown in FIG. 9 can be used in the display apparatus shown in FIG. 1 and FIG. 2. The containment structure shown in FIG. 9 and FIG. 11 can be used in the display apparatus shown in FIG. 4 to FIG. 8.

Figure 9:
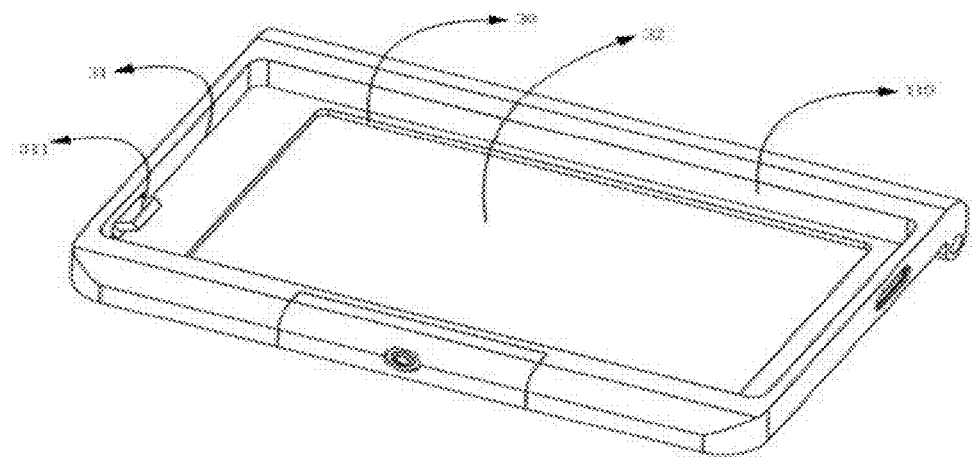
FIG. 9 illustrates a structure schematic diagram of an exemplary containment structure consistent with the disclosed embodiments.

FIG. 9 illustrates a structure schematic diagram of an exemplary containment structure consistent with the disclosed embodiments. As shown in FIG. 9, the containment structure 110 has a side wall 31 and a first opening portion 32. A bayonet or slider 311 matching with the holding groove of the 2D display terminal is disposed on the side wall 31, such that the 2D display terminal may be mounted in the containment structure 110 through the first opening portion 32, wherein the holding groove of the 2D display terminal can be a charging port of the 2D display terminal, or other ports of the 2D display terminal.

When the structure of the display apparatus is one of the structures shown in FIGS. 1-2, in order to realize 3D display, the installation part 30 can only be disposed at the top of the containment structure 110. Therefore, the first opening portion 32 can only be disposed at the bottom or the side wall of the containment structure 110. For example, the opening portion 32 is disposed on the side wall 31 of the containment structure 110.

When the structure of the display apparatus is one of the structures shown in FIGS. 4-8, because the installation part 30 is disposed at the bottom of the containment structure 110 and the light-splitting device 14 is installed on the installation part 30, the first opening portion 32 cannot be on the bottom of the containment structure. That is, the first opening portion 32 can be disposed at the top or on the side wall of the containment structure.

The process for clamping the 2D display terminal in the containment structure 110 is described in detail as follows. The structure of the display apparatus is one of the structures shown in FIGS. 4-8 and the first opening portion 32 is disposed at the top of the containment structure.

Figure 10A:
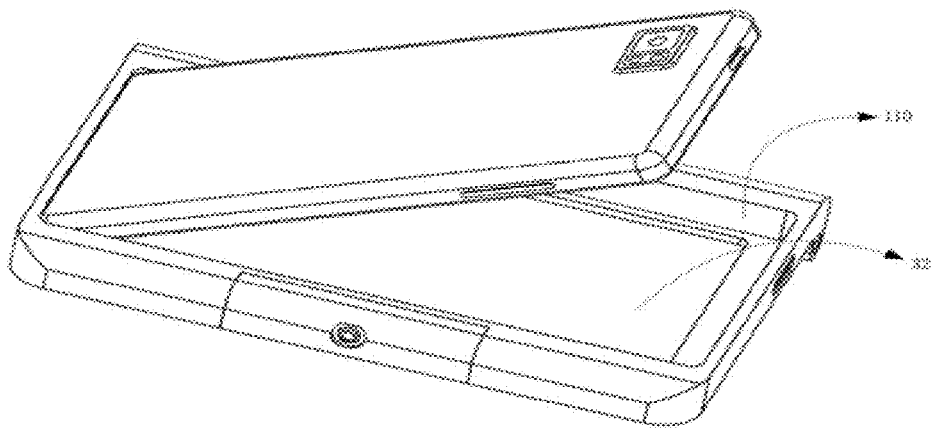
FIG. 10a illustrates a schematic diagram of an exemplary containment structure with a 2D display terminal being clamped in the containment structure consistent with the disclosed embodiments.
Figure 10B:
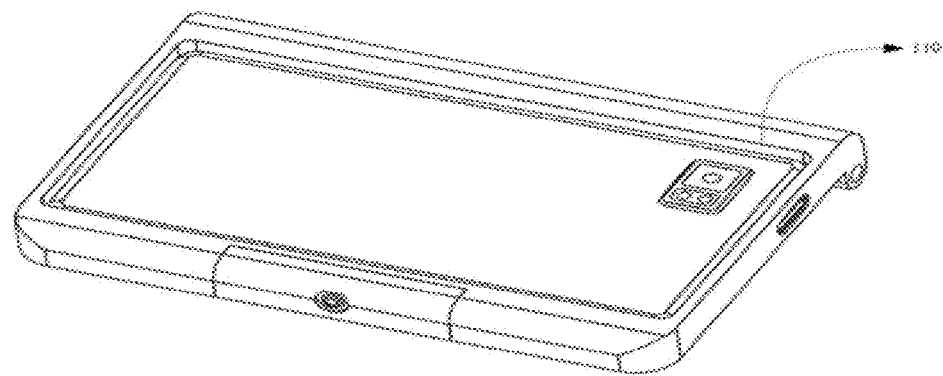
FIG. 10b illustrates a schematic diagram of an exemplary containment structure with a 2D display terminal clamped in the containment structure consistent with the disclosed embodiments.

FIG. 9 illustrates a structure schematic diagram of an exemplary containment structure consistent with the disclosed embodiments. FIG. 10*a* illustrates a schematic diagram of an exemplary containment structure with a 2D display terminal being clamped in the containment structure consistent with the disclosed embodiments. FIG. 10*b* illustrates a schematic diagram of an exemplary containment structure with a 2D display terminal clamped in the containment structure consistent with the disclosed embodiments.

When the 2D display terminal is placed in the containment structure 110, the holding groove of the 2D display terminal is aligned with the bayonet 311 on the side wall 31 of the containment structure 110, and the 2D display terminal is placed in the containment structure 110 through the first opening portion 32, realizing the clamping of the 2D display terminal with the containment structure 110. Through the slider/groove mechanism, the display surface of the 2D display terminal and the light-splitting device fit closely together, thereby improving the light-splitting effect of the light-splitting device.

The process for coupling the 2D display terminal in the containment structure 110 is described in the above FIG. 9 and FIG. 10. The process that the 2D display terminal is slidably mounted in the containment structure is described in detail in FIG. 11 and FIG. 12.

Figure 11:
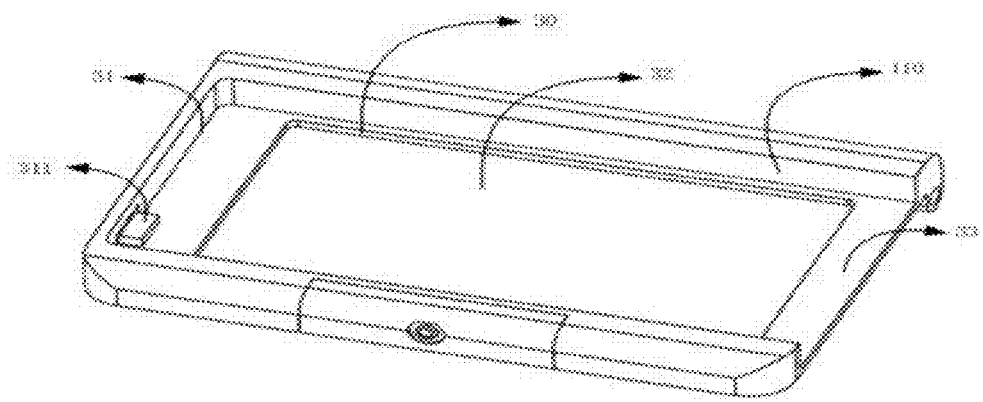
FIG. 11 illustrates a structure schematic diagram of another exemplary containment structure consistent with the disclosed embodiments.

FIG. 11 illustrates a structure schematic diagram of another exemplary containment structure consistent with the disclosed embodiments. As shown in FIG. 11, the containment structure 110 includes a side wall 31, a second opening portion 33 on the side wall 31, such that the 2D display terminal can slidably mounted in the containment structure 110 through the second opening portion 33.

It should be noted that, because the second opening portion is on the side wall 31, the direction of the second opening portion 33 is parallel to the horizontal direction.

Figure 12A:
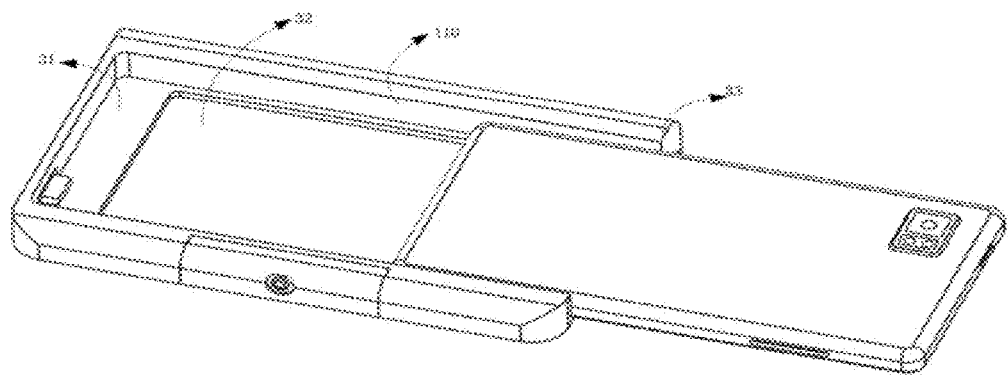
FIG. 12a illustrates a schematic diagram of an exemplary containment structure with a 2D display terminal being slidably mounted in the containment structure consistent with the disclosed embodiments.
Figure 12B:
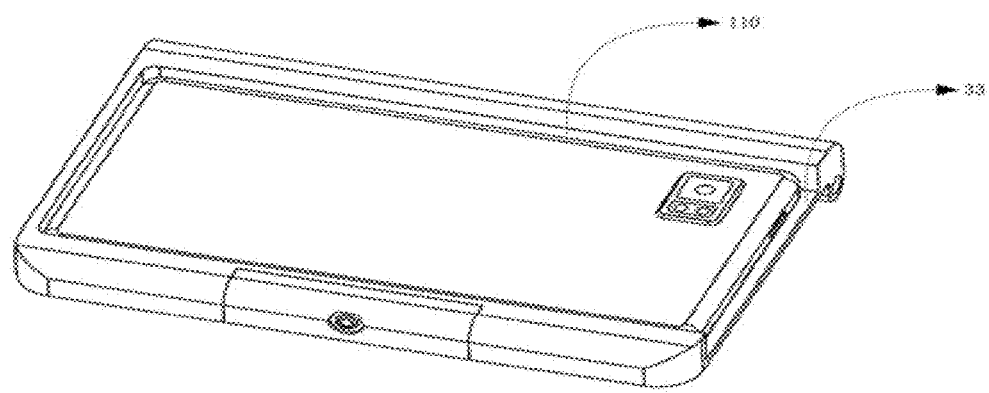
FIG. 12b illustrates a schematic diagram of an exemplary containment structure with a 2D display terminal slidably mounted in the containment structure consistent with the disclosed embodiments.

FIG. 12*a* illustrates a schematic diagram of an exemplary containment structure with a 2D display terminal being slidably mounted in the containment structure consistent with the disclosed embodiments. FIG. 12*b* illustrates a schematic diagram of an exemplary containment structure with a 2D display terminal slidably mounted in the containment structure consistent with the disclosed embodiments.

When the 2D display terminal is placed in the containment structure 110, the corresponding end of the 2D display terminal aims at the second opening portion 33 in the containment structure 110, and the 2D display terminal is pushed into the containment structure 110 through the second opening portion 33, such that the 2D display terminal is slidably mounted in the containment structure 110. Through this way, the display surface of the 2D display terminal and the light-splitting device fit closely together, thereby improving the light-splitting effect of the light-splitting device.

Further, referring to FIG. 11, the containment structure has a top, and the first opening portion 32 is disposed at the top of the containment structure. When the 2D display terminal is placed into the containment structure 110, the 2D display terminal can be pushed into the containment structure 110 through the second opening portion 33. When the 2D display terminal is separated from the containment structure 110, external forces are applied through the first opening portion 31, such that the 2D display terminal can be easily taken out from the display apparatus.

Moreover, referring to FIG. 11, the containment structure has a top, and first opening portion 32 is disposed at the top of the containment structure. Also, the bayonet 311 is disposed on the side wall 31 of the containment structure 110.

When the 2D display terminal is placed into the containment structure 110, the 2D display terminal can be pushed into the containment structure 110 through the second opening portion 33; or the holding groove of the 2D display terminal is aligned with the bayonet 311 on the side wall 31 of the containment structure 110, and the 2D display terminal is placed in the containment structure 110 through the first opening portion 32, realizing the coupling of the 2D display terminal with the containment structure 110. When using the display apparatus, the viewer can choose any one of the methods to place the 2D display terminal in the containment structure according to his/her favorite.

The mechanical structures of the display apparatuses are described in detail in FIG. 1 to FIG. 12. It should be noted that any simple variation of the mechanical structure of the display apparatuses shown in FIG. 1 to FIG. 12 should also be considered within the scope of the disclosure.

It should be noted that, when the light-splitting device is a pure physical type slit grating, or a pure physical type lenticular lens grating, the display apparatus may not have the electric circuitry structure. That is, the display apparatus may be a pure mechanical apparatus. Of course, the electric circuitry structure can be disposed in the display apparatus. At this time, the 2D display terminal combining with the electric circuitry structure can implement some additional functions, such as sound control, data transmission.

When the light-splitting device is a liquid crystal slit grating or a liquid crystal lens grating, in principle, the display apparatus at least needs to set the electric circuitry to control the opening of the liquid crystal slit grating or the liquid crystal lens grating. Of course, the electric circuitry to open the liquid crystal grating can also be controlled by the 2D display terminal.

Further, when the display apparatus has the electric circuitry, the electric circuitry of any one display apparatus shown in FIG. 1 to FIG. 12 is described in detail in combination with FIG. 13 to FIG. 21.

Figure 13:
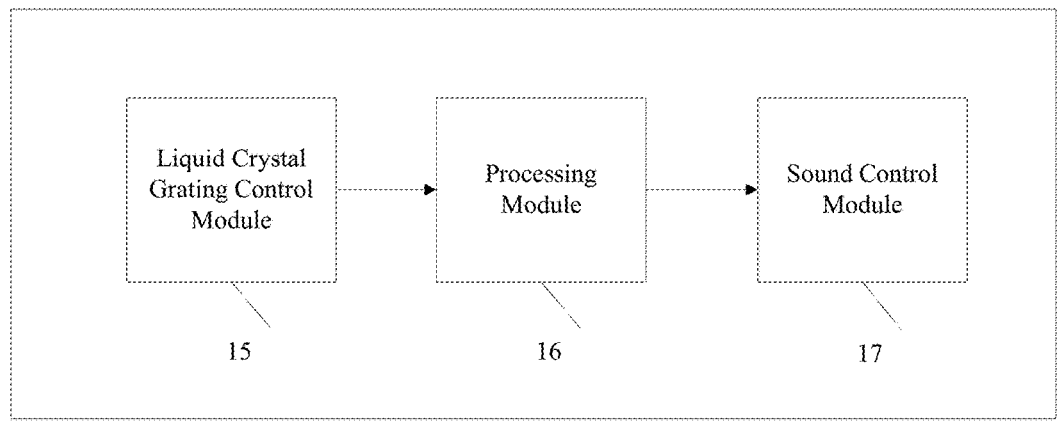
FIG. 13 illustrates a block diagram of an exemplary electric circuitry of a display apparatus consistent with the disclosed embodiments.

FIG. 13 illustrates a block diagram of an exemplary electric circuitry of a display apparatus consistent with the disclosed embodiments. As shown in FIG. 13, because the slit grating includes any liquid crystal slit grating and the lens grating includes any liquid crystal lens grating, when the light-splitting device is liquid crystal slit grating or liquid crystal lens grating, the electric circuitry of the display apparatus may include a liquid crystal grating control module 15, a processing module 16, and a sound control module 17. Other modules or components may also be included.

The liquid crystal grating control module 15 is configured to, when receiving an instruction to open the liquid crystal grating sent from the processing module 16, turn on the liquid crystal slit grating or the liquid crystal lens grating, such that the liquid crystal slit grating or the liquid crystal lens grating has a light-splitting function. Therefore, the parallax image displayed on the 2D display terminal, under the action of the liquid crystal slit grating or the liquid crystal lens grating, can form a 3D image. When the light-splitting effect is not needed, the liquid crystal grating control module 15 can also turn off the liquid crystal slit grating or the liquid crystal lens grating.

The sound control module 17 is configured to, when receiving a playing instruction sent from the processing module 16, play synchronously the audio of the parallax image displayed on the 2D display terminal. The purpose of setting the sound control module 17 is to improve the sound experience of the viewer when the viewer views the 3D images. Because the sound is relatively low when the 2D display terminal displays the images, the viewer's sound experience is affected to some extent. The sound control module 17 which is set in the display apparatus is configured to amplify the audio corresponding to the parallax image displayed on the 2D display terminal, further improving the viewer's experience.

Specifically, the display apparatus may establish a communication connection with the 2D display terminal through wired or wireless connection, such that the display apparatus can obtain the audio source of the parallax image that is currently displayed on the 2D display terminal from the 2D display terminal. After obtaining the audio source, the sound control module 17 of the display apparatus amplifies volume of the received audio source and plays the audio through speakers.

In certain embodiments, the electric circuitry of the display apparatus may also include a first camera module 18a and a first transmission module 19a. It should be noted that the electric circuitry of the display apparatus can only include the first camera module 18a and the first transmission module 19a, or the first camera module 18a and the first transmission module 19a can be added in the electric circuitry shown in FIG. 13.

Figure 14:
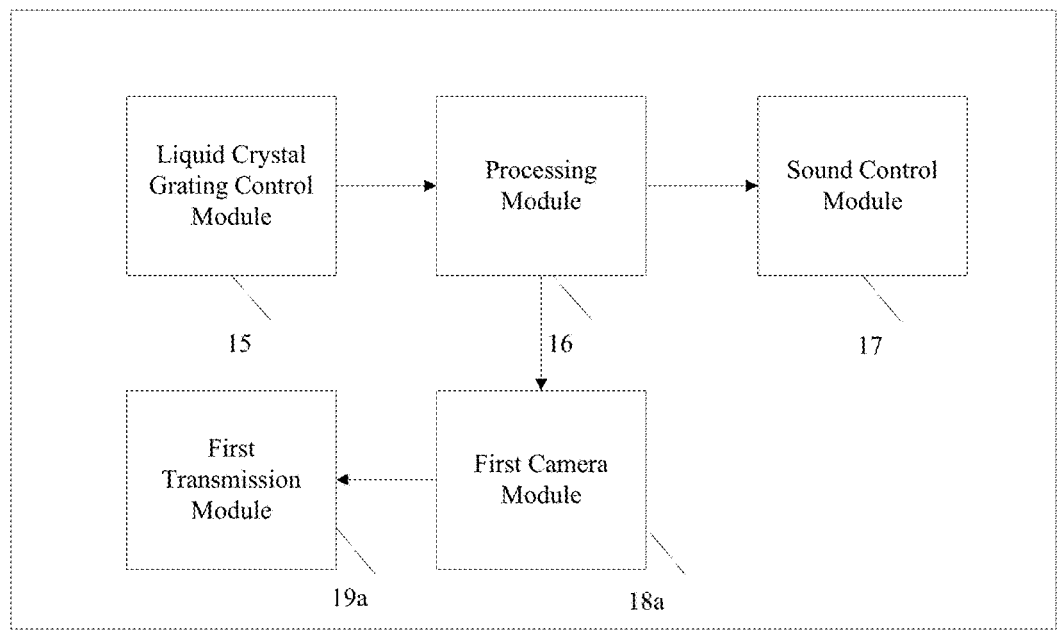
FIG. 14 illustrates a block diagram of an exemplary electric circuitry of another display apparatus consistent with the disclosed embodiments.

FIG. 14 illustrates a block diagram of another exemplary electric circuitry of a display apparatus consistent with the disclosed embodiments. As shown in FIG. 14, on the basis of the electric circuitry shown in FIG. 13, the electric circuitry of the display apparatus may further include a first camera module 18a and a first transmission module 19a.

The first camera module 18a is configured to, after receiving an instruction to obtain image information sent from the processing module 16, obtain the image information of the viewer. The purpose of obtaining the image information of the viewer is to obtain a distance between the viewer and the 3D virtual image based on the image information of the viewer and determine layout parameters of the parallax image displayed on the 2D display terminal, such that the viewing position is not restricted. Because the layout parameters corresponding to the parallax image displayed on the 2D display terminal are determined based on the current viewing position of the viewer, after the image is rearranged according to the layout parameters, the 3D image viewed by the viewer has a better display effect. Specifically, the first camera module 18a may be a camera that is configured to obtain image information of a human face.

The first transmission module 19a is configured to transmit the image information obtained by the first camera module 18a to the 2D display terminal, such that the 2D display terminal can calculate the position information of the viewer relative to the 3D image that is being viewed by the viewer based on the received image information, calculate the layout parameters based on the position information and built-in parameters of the display apparatus, and rearrange the parallax image based on the layout parameters. The first transmission module 19a transmits the image information to the 2D display terminal through various wire or wireless ways, such as Wireless Fidelity (WIFI), Near Field Communication (NFC), Bluetooth, and Radio Frequency (RF). The 2D display terminal calculates the position information of the viewer relative to the 3D image that is being viewed and the corresponding layout parameters.

Specifically, after the 2D display terminal receives the image information sent from the first transmission module 19a, in the beginning, the 2D display terminal processes the image information to calculate the position in three dimensional space of the viewer relative to the first camera module 18a (including position information in the direction of X axis, Y axis and Z axis).

After determining the position in 3D space, the 2D display terminal makes certain compensation to the determined position in 3D space in the light of the specificity of the display apparatus, specifically, compensates position information in the direction of Z axis. The reason for compensating the position information in the direction of Z axis is that certain deviation exists between the 3D virtual image formed by the display apparatus and the position of the first camera module 18a. The compensation value in the direction of Z axis can be preset. Specifically, the compensation value in the direction of Z axis can be set as width or length of the 2D display terminal. Whether the compensation value in the direction of Z axis is set as the width or the length of the 2D display terminal is determined according to the direction that the 2D display terminal is placed in the display apparatus. After the compensation is made, the position information between the viewer and the 3D virtual image can be obtained.

Then, the 2D display terminal can calculate the layout parameters based on the position information between the viewer and the 3D virtual image, as well as the built-in parameter information of the display apparatus (including parameter information of the light-splitting device and placement distance information of the display apparatus). The 2D display terminal rearranges the displayed parallax image based on the calculated layout information, forming the parallax image that is suitable for the current position of the viewer.

After rearranging the parallax image, the 2D display terminal displays the rearranged parallax image. The rearranged parallax image forms the autostereoscopic image for the viewer under the action of the light-splitting device and transflective device. Because the 2D display terminal calculates real-time layout parameters based on the viewer's position, after the parallax image based on the layout parameters is rearranged, the formed 3D virtual image is suitable for the viewer to view, further improving the viewer's experience.

In the electric circuitry shown in FIG. 14, the display apparatus only obtains image information of the viewer, but the display apparatus does not process the image information and calculate the layout parameters. The processing of the image information and the calculation of the layout parameters are performed by the 2D display terminal. When the processing function of the display apparatus is not very strong, this way is a better choice.

When the processing function of the display apparatus is relatively strong, after obtaining the image information of the viewer, the display apparatus can directly process the image information and calculate the layout parameters. Then, the display apparatus transmits the processing results to the 2D display terminal. The electric circuitry of this kind of display apparatus is described in detail through FIG. 15 and FIG. 16.

In certain embodiments, the electric circuitry of the display apparatus may include a second camera module 18b, a position information calculation module 20a and a second transmission module 19b. It is understood that the second camera module 18b, the position information calculation module 20a and the second transmission module 19b can combine with the electric circuitry shown in FIG. 13, or the above modules are added in the electric circuitry shown in FIG. 13.

Figure 15:
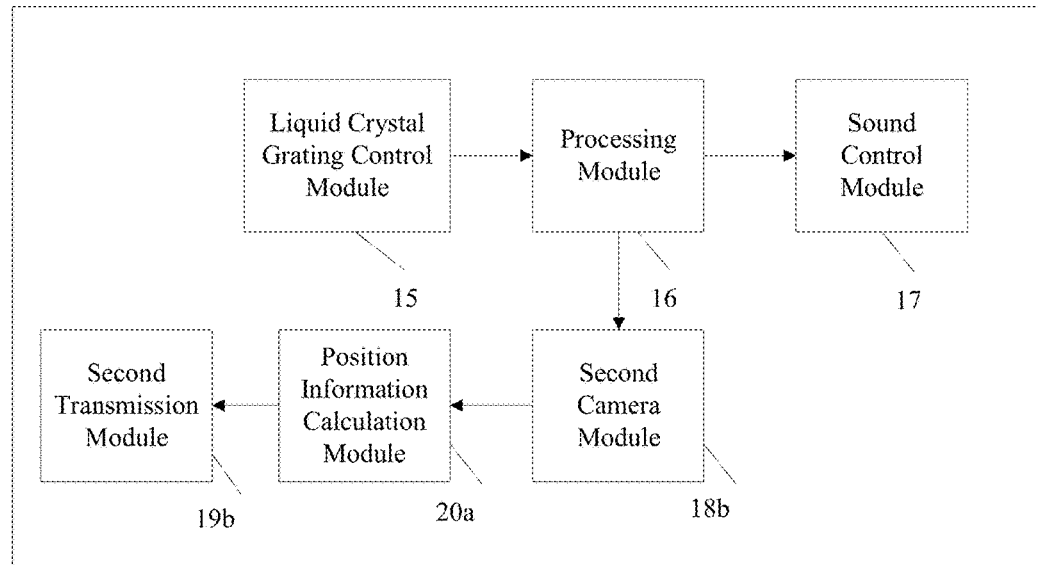
FIG. 15 illustrates a block diagram of an exemplary electric circuitry of another display apparatus consistent with the disclosed embodiments.

FIG. 15 illustrates a block diagram of another exemplary electric circuitry of a display apparatus consistent with the disclosed embodiments. As shown in FIG. 15, the electric circuitry may also include a second camera module 18b, a position information calculation module 20a and a second transmission module 19b on the basis of the electric circuitry shown in FIG. 13.

The second camera module 18b is configured to, after receiving an instruction to obtain image information sent from the processing module 16, obtain the image information of a viewer. The purpose of obtaining the image information of the viewer is to obtain a distance between the viewer and the 3D virtual image based on the image information of the viewer and determine layout parameters of the parallax image displayed on the 2D display terminal, such that the viewing position of the viewer is not restricted. Because the layout parameters corresponding to the parallax image displayed on the 2D display terminal are determined based on the current viewing position of the viewer, after the image is rearranged according to the layout parameters, the 3D image viewed by the viewer has a better display effect. Specifically, the second camera module 18b may be a camera that is configured to obtain image information of a human face.

The position information calculation module 20a is configured to, based on the image information obtained by the second camera module 18b, calculate position information of the viewer relative to the 3D virtual image.

Specifically, after the position information calculation module 20a obtains the image information obtained by the second camera module 18b, in the beginning, the position information calculation module 20a processes the image information to calculate the viewer's position in 3D space relative to the second camera module 18b (including position information in the direction of X axis, Y axis, and Z axis).

After the position in 3D space is calculated, the position information calculation module 20a makes certain compensation to the determined position in 3D space in the light of the specificity of the display apparatus, specifically, compensates position information in the direction of Z axis. Then, the position information calculation module 20a calculates the position information between the viewer and the 3D virtual image. The reason for compensating the position information in the direction of Z axis is that certain deviation exists between the 3D virtual image formed by the display apparatus and the position of the second camera module 18b. The compensation value in the direction of Z axis can be preset. Specifically, the compensation value in the direction of Z axis can be set as width or length of the 2D display terminal. Whether the compensation value in the direction of Z axis is set as the width or the length of the 2D display terminal is determined according to the direction that the 2D display terminal is placed in the display apparatus. After the compensation is made, the position information between the viewer and the 3D virtual image can be obtained.

The second transmission module 19b is configured to transmit the position information calculated by the position information calculation module 20a to the 2D display terminal, such that the 2D display terminal can calculate layout parameters based on the received position information and the built-in parameter information of the display apparatus, and rearrange the parallax image. At last, the rearranged parallax image is displayed. The light of the parallax image forms an autostereoscopic image under the action of the light-splitting device and the transflective device. The second transmission module 19b transmits the position information to the 2D display terminal through various wire or wireless ways, such as Wireless Fidelity (WIFI), Near Field Communication (NFC), Bluetooth, and Radio Frequency (RF).

When the image is being rearranged, the layout parameters are determined according to the current position of the viewer. Therefore, when viewing the autostereoscopic image, the viewer is not restricted by the viewing position, further improving the viewer's viewing experience.

In certain embodiments, the display apparatus may include a second camera module 18b, a position information calculation module 20a, a layout parameters calculation module 20b and a second transmission module 19b. It is understood that the second camera module 18b, the position information calculation module 20a, the layout parameters calculation module 20b and the second transmission module 19*b* can combine with the electric circuitry shown in FIG. 13, or the above modules are added to the electric circuitry shown in FIG. 13.

Figure 16:
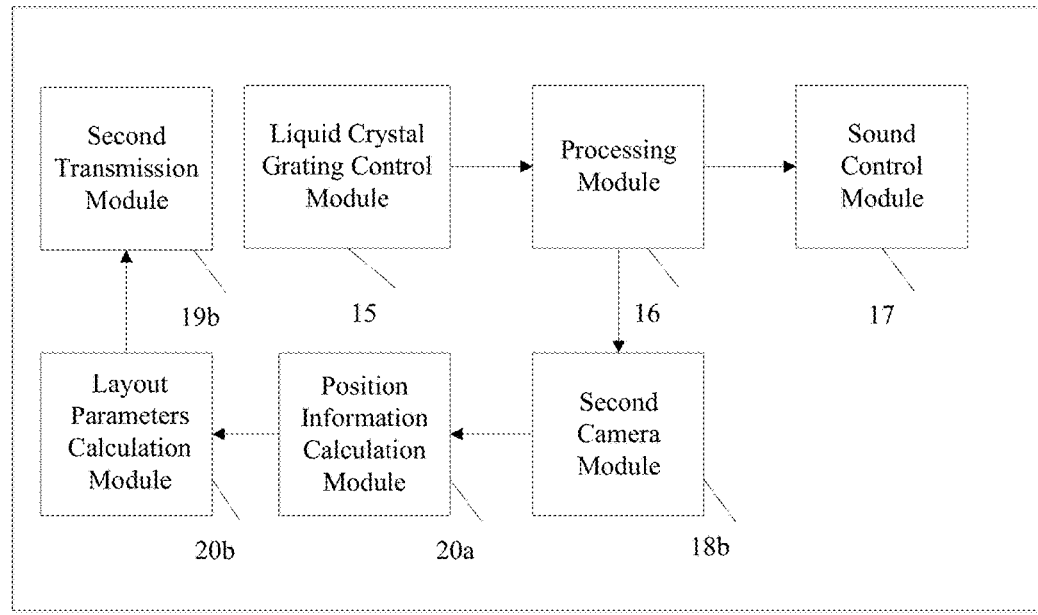
FIG. 16 illustrates a block diagram of an exemplary electric circuitry of another display apparatus consistent with the disclosed embodiments.

FIG. 16 illustrates a block diagram of another exemplary electric circuitry of a display apparatus consistent with the disclosed embodiments. As shown in FIG. 16, on the basis of the electric circuitry shown in FIG. 13, the electric circuitry may also include a second camera module 18*b*, a position information calculation module 20*a*, a layout parameters calculation module 20*b* and a second transmission module 19*b*.

The second camera module 18*b* is configured to, after receiving an instruction to obtain image information sent from the processing module 16, obtain the image information of the viewer. The purpose of obtaining the image information of the viewer is to obtain a distance between the viewer and the 3D virtual image based on the image information of the viewer and determine layout parameters of the parallax image displayed on the 2D display terminal, such that the viewing position of the viewer is not restricted. Because the layout parameters corresponding to the parallax image displayed on the 2D display terminal are determined based on the current viewing position of the viewer, after the image is rearranged according to the layout parameters, the 3D image viewed by the viewer has a better display effect. Specifically, the second camera module 18*b* may be a camera that is configured to obtain image information of a human face.

The position information calculation module 20*a* is configured to, based on the image information obtained by the second camera module 18*b*, calculate position information of the viewer relative to the 3D virtual image.

Specifically, after the position information calculation module 20*a* obtains the image information obtained by the second camera module 18*b*, in the beginning, the position information calculation module 20*a* processes the image information to calculate the viewer's position in 3D space relative to the second camera module 18*b* (including position information in the direction of X axis, Y axis, and Z axis).

After the position in 3D space is calculated, the position information calculation module 20*a* makes certain compensation to the determined position in the 3D space for the specificity of the display apparatus. Specifically, position information in the direction of Z axis is compensated. Then, the position information calculation module 20*a* calculates the position information between the viewer and the 3D virtual image.

The reason for compensating the position information in the direction of Z axis is that a certain deviation exists between the 3D virtual image formed by the display apparatus and the position of the second camera module 18*b*. The compensation value in the direction of Z axis can be preset. Specifically, the compensation value in the direction of Z axis can be set as the width or the length of the 2D display terminal. Whether the compensation value in the direction of Z axis is set as the width or the length of the 2D display terminal is determined according to the direction that the 2D display terminal is placed in the display apparatus. After the compensation is made, the position information between the viewer and the 3D virtual image can be obtained.

The layout parameters calculation module 20*b* is configured to calculate the layout parameters based on the position information calculated by the position information calculation module 20*a* and the built-in parameter information of the display apparatus.

Then, the layout parameters calculation module 20*b* can calculate real-time layout parameters based on the determined position information between the viewer and the 3D virtual image, as well as the built-in parameter information of the display apparatus (including parameter information of the light-splitting device and placement distance information of the display apparatus).

The second transmission module 19*b* is configured to transmit the layout parameters calculated by the layout parameters calculation module 20*b* to the 2D display terminal, such that the 2D display terminal can rearrange the parallax image based on the received layout parameters. At last, the rearranged parallax image is displayed. The light of the parallax image forms an autostereoscopic image under the action of the light-splitting device and the transflective device. The second transmission module 19*b* transmits the layout parameters to the 2D display terminal through various wire or wireless ways, such as Wireless Fidelity (WIFI), Near Field Communication (NFC), Bluetooth, and Radio Frequency (RF).

When the image is being rearranged, the layout parameters are determined according to the current position of the viewer. Therefore, when viewing the autostereoscopic image, the viewer is not restricted by the viewing position, further improving the viewer's viewing experience.

It should be noted that, the current display apparatus displays the image according to default brightness or contrast of the display apparatus. However, in the display apparatuses shown in FIG. 13 to FIG. 16, because the image that the viewer views is formed under the action of the transflective device, the resolution of the 3D image can be easily affected by ambient light. If the 2D display terminal still displays the image according to the default brightness or contrast, when the ambient light lightens, the resolution of the 3D virtual image formed under the action of the transflective device is also affected. Therefore, in order to ensure the image quality of the display apparatus, at least one of the brightness and contrast of the displayed image as well as a gamma value of the display apparatus needs to be adjusted according to intensity of the current ambient light. The process for adjusting the brightness and contrast of the displayed image as well as the gamma value of the display apparatus is described in the followings.

The electric circuitry of the display apparatus may also include a light detection module 24 and a third transmission module 19*c*. It is understood that the light detection module 24 and the third transmission module 19*c* may also be added to any one of the electric circuits shown in FIG. 13 to FIG. 16. Below is an example that the light detection module 24 and the third transmission module 19*c* are added in the electric circuitry shown in FIG. 16.

FIG. 17 illustrates a block diagram of an exemplary electric circuitry of another display apparatus consistent with the disclosed embodiments. As shown in FIG. 17, the display apparatus, on the basis of the electric circuitry shown in FIG. 16, may further include a light detection module 24 and a third transmission module 19*c*.

The light detection module 24 is configured to, after receiving a detection instruction sent from the processing module 16, detect ambient light intensity of the current environment of the display apparatus, wherein the light detection module 24 can be any photosensitive component.

The third transmission module 19*c* is configured to transmit the ambient light intensity detected by the light detection module 24 to the 2D display terminal, such that the 2D display terminal can adjust at least one of the brightness and contrast of the parallax image as well as the gamma value of the 2D display terminal based on the received light intensity.

Specifically, based on the received light intensity, the 2D display terminal calculates a difference value between the light intensity and a preset threshold (the corresponding brightness value for the display apparatus to display the image according to the default brightness).

When the difference value is a positive value, it indicates that the environment around the display apparatus is brighter, and the image quality of the display apparatus is relatively poor. Based on the difference value, one or more of the brightness and contrast of image as well as the gamma value of the display apparatus can be adjusted.

When the difference value is a negative value, it indicates that the environment around the display apparatus is darker, and the image quality of the display apparatus is well enough. But in order to reduce the power consumption of the display apparatus, one or more of the brightness and the contrast of the image as well as the gamma value of the display apparatus can be adjusted based on the difference value. Therefore, the normal display effect is satisfied and the power consumption of the display apparatus is also reduced at the same time.

Specifically, the 2D display terminal can be adjusted through the following ways.

The 2D display terminal presets a threshold value for displaying the image on the display screen according to the default brightness/contrast. For example, a threshold value can be set to 50, wherein the ambient light intensity in a darkroom environment is set to 0, and the ambient light intensity under the condition of strong light is set to 100.

The 2D display terminal converts the received ambient light intensity to a corresponding value. The value is compared with the threshold value to obtain the difference value β. If β is greater than 0, it indicates that the ambient light is brighter. That is, the greater the β is, the brighter the ambient is. At this point, one or more of the brightness and contrast of image as well as the gamma value of the display apparatus can be increased correspondingly. If β is less than 0, it indicates that the ambient light is darker. That is, the smaller the β is, the darker the ambient is. At this point, under the condition that the image quality is ensured, one or more of the brightness and the contrast of the image as well as the gamma value of the display apparatus can be decreased correspondingly, such that the power consumption of the display apparatus is reduced.

For example, brightness/contrast of an image can be adjusted using a simple gray-scale linear transformation. The formula for adjusting the brightness/contrast is as follows:

$$y=[x-127.5*(1-B)]*k+127.5*(1+B)$$

wherein x is pixel value before adjustment and y is pixel value after adjustment; B is a value between −1 and 1, including −1 and 1, and B is used to adjust the brightness; k is used to adjust the contrast, and arctan (k) is a value between 1 and 89, including 1 and 89.

Therefore, $k=\tan((45+44*c)/180*\pi)$, wherein c is a value between −1 and 1, including −1 and 1. The value is generally used to set the contrast. Specially, when B=0, y=(x−127.5)*k+127.5 and only the contrast is adjusted. When c=0 and k=1, y=x+255*B, and only the brightness is adjusted.

It should be noted that, when the displayed image is not flipped, after the light of the image displayed on the 2D display terminal passes through the light-splitting device and the transflective device, the formed image is an image cannot be normally viewed by the viewer. The reason is described in detail as follows.

FIG. 18a illustrates an imaging principle of a current autostereoscopic display apparatus. FIG. 18b illustrates an imaging principle of a display apparatus consistent with the disclosed embodiments.

In FIG. 18a, a plane 104 is a screen of a current autostereoscopic display apparatus. Point a and point b represent points in left view and right view corresponding to a same point in a real scene. Point c and point d represent points in left view and right view corresponding to another point in the real scene. After the lights emitted from point a, point b, point c and point d pass through any device (e.g., a lens array, a parallax barrier array) that can directionally split the light, the lights are directed separately to the left eye and the right eye in a viewing area of a viewer. After signals are processed by the brain, point E and point F having 3D effect can be formed.

In FIG. 18b, a transflective device is parallel to a display screen. On the basis of the structure shown in FIG. 18a, a transflective mirror plane 105 is parallelly placed in front of the plane 104. An image point a' is formed after the light emitted from point a passes through the transflective mirror plane 105. Similarly, points b', c', and d' are image points of b, c, and a, respectively. The image points viewed by the viewer through the transflective mirror plane 105 become E' and F' which also have 3D effect. However, comparing to the 3D effect of point E and point F, the positions of E' and F' viewed by the viewer in FIG. 18b are mirror images of point E and point F along the horizontal axis. Under this circumstance, the position of the image viewed by the viewer and the position of the image displayed on the display screen are reversed. That is, after the light of the image displayed on the screen is transmitted and reflected by the transflective device, the formed image is an image that cannot be normally viewed by the viewer. Therefore, the 2D display terminal needs to flip the displayed image, such that the light of the displayed image, under the action of the transflective device, forms an image that can be normally viewed by the viewer, further improving the viewer's visual experience.

Because data source of the displayed image is stored in the 2D display terminal, a flip operation on the image can only be performed by the 2D display terminal. Before the 2D display terminal performs the flip operation on the image, the 2D display terminal needs to perform a corresponding flip operation on the image according to a placement direction of the 2D display terminal in the display apparatus.

The placement direction of the 2D display terminal on the display apparatus can be stored in the 2D display terminal or the display apparatus. When the placement direction is stored in the 2D display terminal, the 2D display terminal can obtain locally the placement direction information, and perform the corresponding flip operation. When the placement direction is stored in the display apparatus, the display apparatus needs to obtain the placement direction, and then send the placement direction to the 2D display terminal.

Based on the placement direction of the 2D display terminal in the containment structure that is stored in the display apparatus, the electric circuitry of the present disclosure may also include a configuration information reading module 23 and a fourth transmission module 19d. It should be understood that the configuration information reading module 23 and the fourth transmission module 19d can be combined with any electric circuitry shown in FIG. 13 to FIG. 17.

Figure 19:
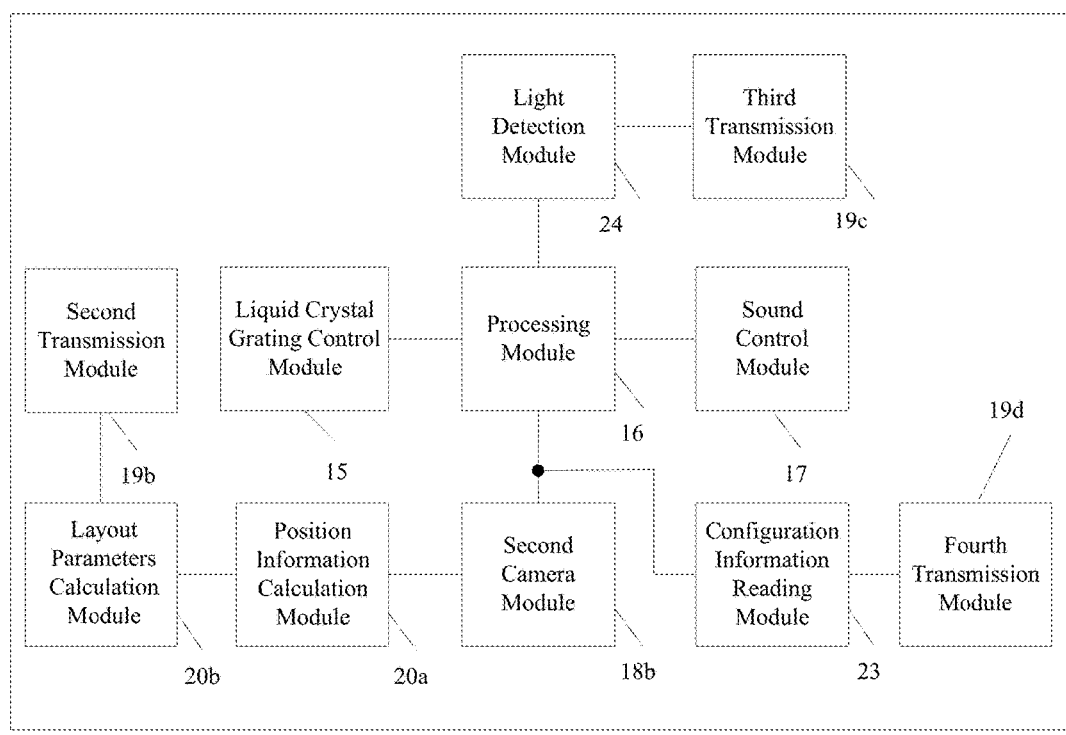
FIG. 19 illustrates a block diagram of an exemplary electric circuitry of another display apparatus consistent with the disclosed embodiments.

FIG. 19 illustrates a block diagram of an exemplary electric circuitry of another display apparatus consistent with the disclosed embodiments. As shown in FIG. 19, the display apparatus, on the basis of the electric circuitry shown in FIG. 17, may further include a configuration information reading module 23 and a fourth transmission module 19d.

The configuration information reading module 23 is configured to, after receiving a read instruction sent from the processing module 16, read the placement direction of the 2D display terminal in the containment structure.

The fourth transmission module 19d is configured to transmit the placement direction read by the configuration information reading module 23 to the 2D display terminal, such that the 2D display terminal can perform a horizontal flip operation or a vertical flip operation based on the received placement direction.

As used herein, the placement direction information of the 2D display terminal refers to a position relationship between the origin of coordinates of the display screen of the 2D display terminal and the viewing side of the display apparatus. The viewing side of the display apparatus is a side relative to the position of the 3D image to be viewed. That is, the viewing side is the position that the viewer can view the 3D image to be viewed. If the placement direction of the 2D display terminal is different, the corresponding flip method of the 2D display terminal is different. That is, based on the placement direction of the 2D display terminal, a horizontal flip operation or a vertical flip operation is performed.

Specifically, when the placement direction of the 2D display terminal in the containment structure read by the configuration information reading module 23 is that the 2D display terminal is away from the viewing side of the display apparatus, the 2D display terminal performs a horizontal flip operation on the image to be displayed.

The viewing side of the display apparatus is the side relative to the position of the 3D image to be viewed. The 2D display terminal away from the viewing side of the display apparatus refers to that origin of coordinates of the display screen of the 2D display terminal is on the side away from the viewing side of the display apparatus, or the origin of coordinates of the display screen is on the side relative to the viewing side of the display apparatus or the side away from the position of the viewer.

Figure 20A:
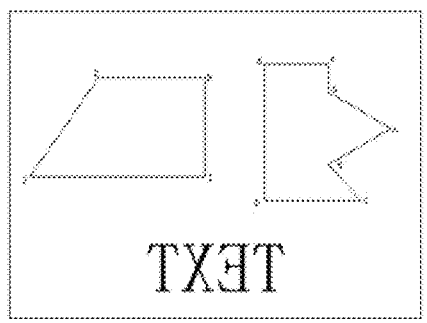
FIG. 20a illustrates a schematic diagram of an exemplary virtual image formed when a display apparatus displays an image corresponding to image data without a flip operation performed.
Figure 20B:
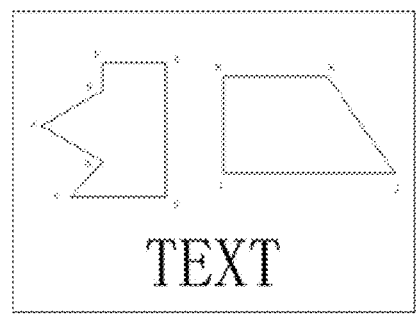
FIG. 20b illustrates a schematic diagram of an exemplary virtual image formed when a display apparatus displays an image corresponding to image data with a flip operation performed.

FIG. 20a illustrates a schematic diagram of an exemplary virtual image formed when a display apparatus displays an image corresponding to image data without a flip operation being performed; FIG. 20b illustrates a schematic diagram of an exemplary virtual image formed when a display apparatus displays an image corresponding to image data with a flip operation being performed.

When a horizontal flip operation is not performed on the image data, a polygon ABCDEFG, a trapezoid HIJK and a word TEXT are displayed on the 2D display terminal according to a normal display way of the display apparatus, as shown in FIG. 20b. As shown in FIG. 20a, the virtual image formed in the display apparatus and the image displayed on the 2D display terminal are left-right reversed.

According to mirror image theory, the polygon that originally locates at the left of the trapezoid HIJK is at the right of the trapezoid HIJK; point A of the polygon ABCDEF at the far left of the trapezoid HIJK becomes at the far right of the trapezoid HIJK; and the word TEXT is also performed a horizontal flip operation according to the mirror image theory. The displayed image is a left-right reversed image, bringing a poor viewing experience. Therefore, a horizontal flip operation can be performed on the image data such that the formed virtual image is an image (as shown in FIG. 20b)

that can be viewed normally by the viewer, further improving the viewer's viewing experience.

The way that the 2D display terminal performs a horizontal flip is described in detail as follows.

In the beginning, content format of the image data is identified. The purpose of identifying the content format of the image data is to convert the image data to an image format. When the image data is an image, there is no need to process the image data. When the image data is a word, a bitmap image corresponding to the word is redrawn. When the image data is a video, the video is decoded and converted to multiple frames of images.

Then, pixels of the obtained image are performed a horizontal flip operation along the vertical axis of the image. For example, pixels of the image can be performed a horizontal flip operation using the following method.

It is assumed that the pixels of an image form an M×N matrix array. N number of the pixels in the first row are sequentially labeled, from left to right, 1, 2, 3 . . . N−3, N−2, N−1, N. N is an integer number greater than 2. The order of the pixels in the first row is left-right reversed along the vertical axis of the image. That is, pixel N at the far right is arranged at the position of pixel 1 at the far left; pixel N−1 is arranged at the position of pixel 2; pixel N−2 is arranged at the position of pixel 3, and so on. After the pixels are sorted, a horizontal flip operation is performed on the image.

Specifically, when the placement direction of the 2D display terminal in the containment structure read by the configuration information reading module 23 is that the 2D display terminal is close to the viewing side of the display apparatus, the 2D display terminal performs a vertical flip operation on the image to be displayed.

The viewing side of the display apparatus is the side relative to the position of the 3D image to be viewed. The 2D display terminal close to the viewing side of the display apparatus refers to that origin of coordinates of the display screen of the 2D display terminal is on the side close to the viewing side of the display apparatus, or the origin of coordinates of the display screen is on the same side as the viewing side of the display apparatus or the side close to the position of the viewer.

Figure 21A:
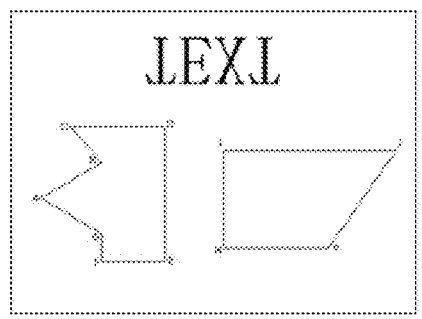
FIG. 21a illustrates a schematic diagram of an exemplary virtual image formed when a display apparatus displays an image corresponding to image data without a flip operation performed.
Figure 21B:
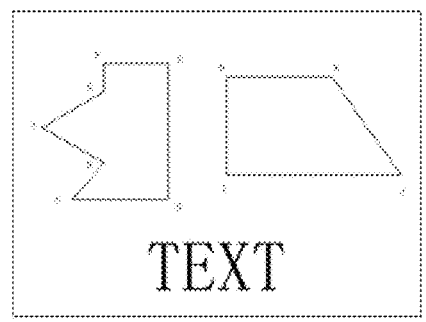
FIG. 21b illustrates a schematic diagram of an exemplary virtual image formed when a display apparatus displays an image corresponding to image data with a flip operation performed.
Figure 22:
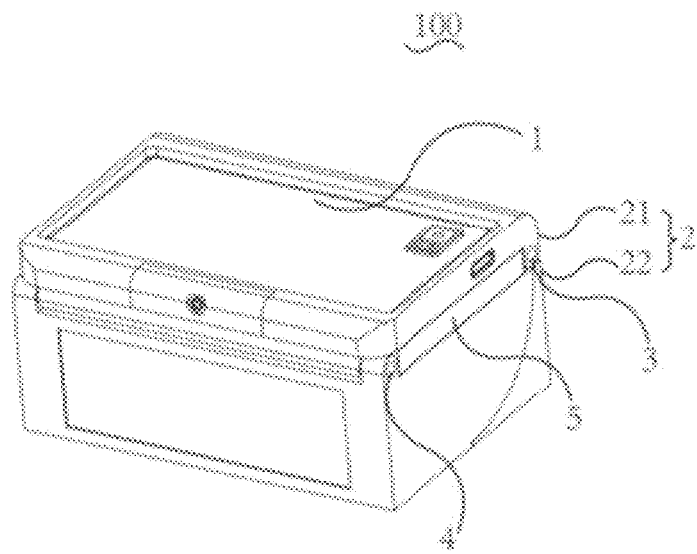
FIGS. 22-25 illustrate an exemplary display system consistent with the disclosed embodiments.

FIG. 21a illustrates a schematic diagram of an exemplary virtual image formed when a display apparatus displays an image corresponding to image data without a flip operation performed. FIG. 21b illustrates a schematic diagram of an exemplary virtual image formed when a display apparatus displays an image corresponding to image data with a flip operation performed.

When a flip operation is not performed on the image data, a polygon ABCDEFG, a trapezoid HIJK and a word TEXT are displayed on the 2D display terminal according to a normal display way of the display apparatus, as shown in FIG. 21b. As shown in FIG. 21a, the formed virtual image and the image displayed on the 2D display terminal is up-down reversed. At this point, the 2D display terminal can perform a vertical flip operation on the image, such that the 3D virtual image formed by the display apparatus is the image shown in FIG. 21b.

In the beginning, the 2D display terminal identifies content format of the image data. The purpose of identifying the content format of the image data is to convert the image data to an image format.

Then, a vertical flip operation is performed on pixels of the obtained image along the horizontal axis of the image. The difference between the vertical flip operation and the horizontal flip operation is that during vertical flip operation, when pixels of the image are rearranged, M number of the pixels in the first column are up-down reversed. The up-down reversed method is similar to the left-right reversed method. For example, the first pixel in the first row (i.e., the first pixel in the first column) is arranged at the position of the first pixel in the Mth row (i.e., the Mth pixel in the first column), and the first pixel in the Mth row is arranged at the position of the first pixel in the first row at the same time. The second pixel in the first row is arranged at the position of the second pixel in the Mth row, and the second pixel in the Mth row is arranged at the position of the second pixel in the first row at the same time. After sorting the pixels, the image is performed a vertical flip operation. A row reversed operation may also be performed on the image. For example, pixels of the first row and pixels of the Mth row are up-down reversed; pixels of the second row and pixels of the (M−1)th row are up-down reversed, and so on. The up-down reversed process is not repeated herein. By performing the vertical flip operation, it can ensure that the virtual image viewed by the viewer is a normal image (shown in FIG. 21b), further improving the viewer's viewing experience.

Correspondingly, a display system is also provided. The display system includes a display apparatus and a 2D display terminal detachably installed on the display apparatus, wherein the display apparatus may be any display apparatus described in the disclosure. When the display apparatus displays an image, the light of the parallax image displayed on the 2D display terminal, under the action of the light-splitting device and the transflective device, can form a 3D image for the viewer.

FIGS. 22-25 illustrate an exemplary display system consistent with the disclosed embodiments. As shown in FIGS. 22-25, a display system 100 may include a display apparatus 1 and a packaging box (not labeled). The display apparatus 1 may be any appropriate electronic device having certain display functions, such as a mobile phone, a smart phone, a tablet computer, a digital book reader, a notebook computer, and any other type of device.

The display apparatus 1 may have a display surface (not shown). The packaging box includes a packaging body 2, a first connecting mechanism 3, a moveable connecting mechanism 4, and a transflective device 5. Further, the packaging body 2 may include a containment structure 21 and a supporting member 22. The containment structure 21 is configured to accommodate the display apparatus 1. The packaging box is configured to pack the display apparatus 1 and its accessories/parts, with certain special display functionalities.

Figure 23:
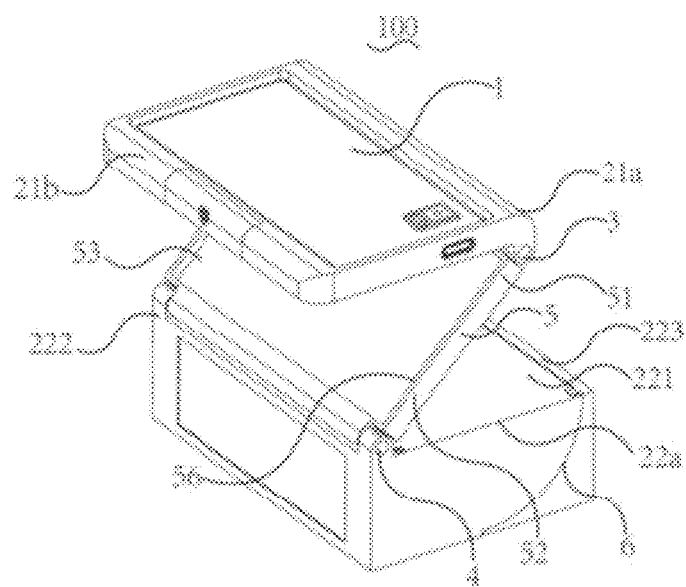

FIG. 23 illustrates an exemplary display apparatus in an extended position. As shown in FIG. 23, the containment structure 21 may include a connecting end 21a and a free end 21b opposite to the connecting end 21a. The transflective device 5 may include a first end 51 and a second end 52 opposite to the first end 51, and a first surface 53 and a second surface 54 opposite to the first surface 53. The first surface 53 faces the containment structure 21, and the second surface 54 faces the supporting member 22.

The first end 51 of the transflective device 5 is coupled to the connecting end 21a of the containment structure 21 through the connecting mechanism 3. The second end 52 of the transflective device 5 is moveably coupled to the supporting member 22 through the moveable connecting mechanism 4. When the display system 100 is opened (e.g., extended), a virtual image of the image displayed by the display apparatus 1 can be formed in the space formed behind the second surface 54 of the transflective device 5.

Figure 25:
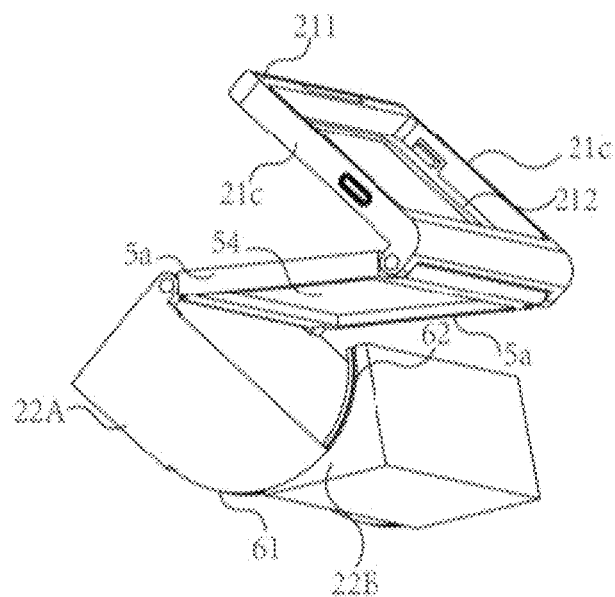

As shown in FIG. 25, the containment structure 21 includes a hollow frame 211, and the hollow frame 211 forms a containing space 212 for housing the display apparatus 1. The containing space 212 matches the display apparatus 1.

The free end 21b of the containment structure 21 has an opening (not labeled) for placing the display apparatus into the containing space 212 through the opening. The shapes and structures of the containment structure 21 are not limited, as long as the containment structure 21 can accommodate the display apparatus 1 and expose the display screen 71 of the display apparatus 1 which faces the transflective device 5, such that the light of the displayed image on the display apparatus 1 can pass through the transflective device 5 to form a virtual image in the space formed behind the second surface 54 of the transflective device 5.

The supporting member 22 can be a hollow rectangular box body, and the supporting member 22 may be used to contain other parts or accessories of the display system 100 and/or the display apparatus 1, such as manuals, ear plugs, and USB cables. The supporting member 22 may include a connecting plane 221, a connecting end 222, and a free end 223 opposite to the connecting end 222.

The connecting plane 221 is disposed between the connecting end 222 and the free end 223. The second surface 54 of the transflective device 5 faces the connecting plane 221. Further, the free end 21b of the containment structure 21 and the connecting end 222 of the supporting member 22 are on the same side, and the connecting end 21a of the containment structure 21 and the free end 223 of the supporting member 22 are on the same side. The containment structure 21 can be parallel to the supporting member 22.

Further, the containment structure 21 also includes two first edges 21c connecting the free end 21b of the containment structure 21 and the connecting end 21a of the containment structure 21. The transflective device 5 also includes two second edges 5a connecting the first connecting end 51 and the second connecting end 52. The length of the first edges 21c of the containment structure 21 is approximately the same as the length of the second edges 5a of the transflective device 5. The supporting member 22 also includes two third edges 22a connecting the free end 223 and the connecting end 221 of the supporting member 22, and the length of the third edges 22a is approximately the same as the length of the first edges 21c of the containment structure 21. Thus, when the containment structure 21 is folded and covers the supporting member 22, the package body 2 forms a box structure in the shape of a cube or a rectangular prism.

Figure 24:
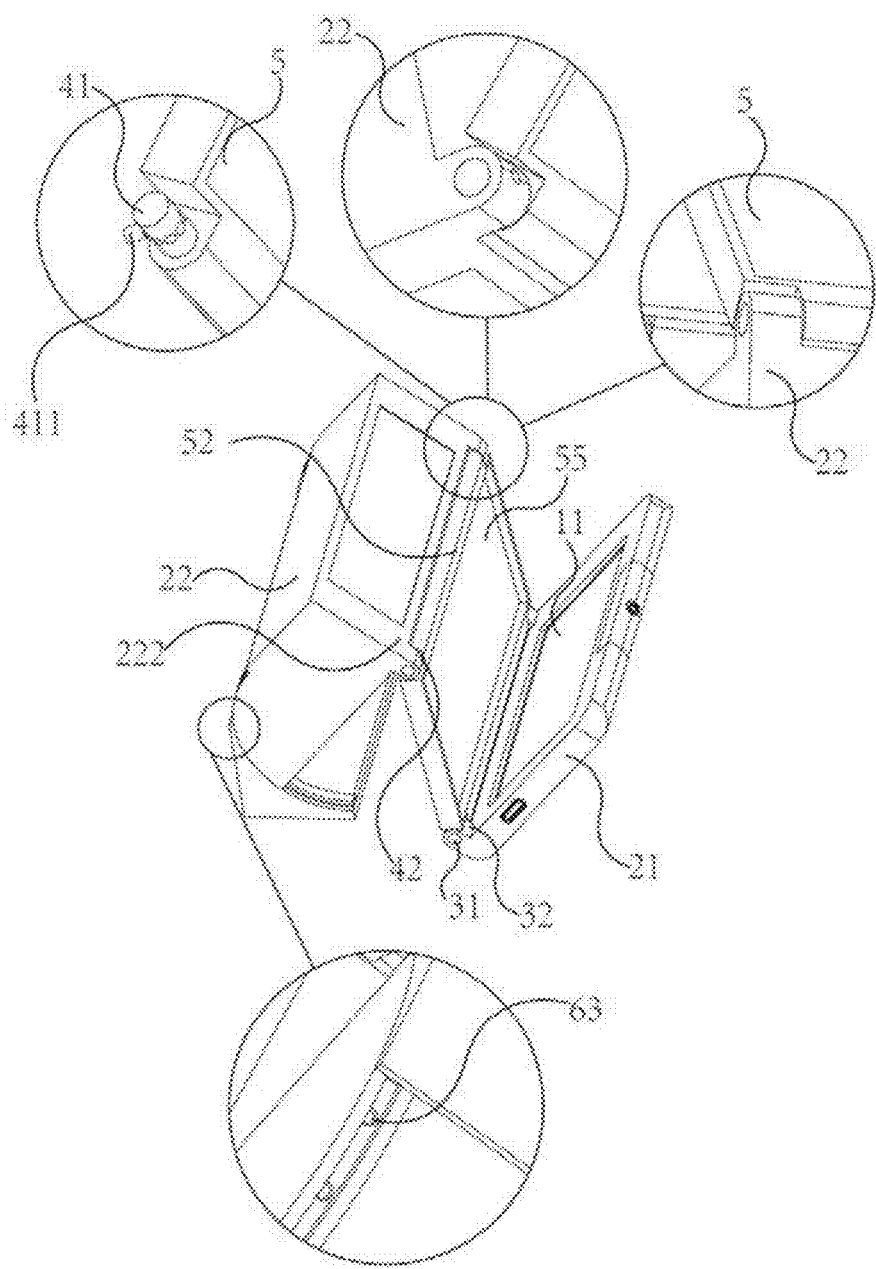

The second end 52 of the transflective device 5 is moveably coupled to the connecting end 222 of the supporting member 22 through the moveable connecting mechanism 4. As shown in FIG. 24, the moveable connecting mechanism 4 can include a positioning shaft 41 on the side of the second end 52 of the transflective device 5 and a positioning sleeve 42 on the connecting end 222 of the supporting member 22. The positioning shaft 41 has a positioning protrusion 411, and a corresponding positioning groove (not shown) is located on the inner side of the positioning sleeve 42. The positioning shaft 41 can be inserted into the positioning sleeve 42, with the positioning protrusion 411 disposed in the positioning groove.

Alternatively, the positioning shaft 41 may be disposed on the supporting member, and the corresponding positioning sleeve 42 may be disposed on the second end 52 of the transflective device 5. Also, the positioning protrusion may be located on the positioning sleeve, and the corresponding positioning groove may be located on the positioning shaft. Other structures may also be used for the moveable connecting mechanism, including other rotary positioning structures, such as hinge structures.

The first connecting mechanism 3 may be a moveable connecting mechanism. The first connecting mechanism 3 may have a similar structure to the moveable connecting mechanism 4, and can be disposed between the first end 51 of the transflective device 5 and the connecting end 21a of the containment structure 21. In certain embodiments, the first connecting mechanism 3 may have a different structure from the moveable connecting mechanism 4. Further, the first connecting mechanism 3 may have other rotary positioning structures, such as hinge structures.

The transflective device 5 may include a transflective member 55 and a fixing member 56 for fixing the transflective member 55. In certain embodiments, the fixing member 56 is made of a transparent material.

The transflective member 55 is a device that has a surface coating and whose transmissive/reflecting ratio can be adjusted according to the ambient light. With a power supply, the transflective member 55 can also be a liquid crystal glass device (also known as electronically-controlled liquid crystal glass). When power is applied, the transmissive ratio can be adjusted by adjusting the voltage of the device to adapt to changing light environment.

In operation, the display apparatus 1 is initially packed inside the containment structure 21, and the display system 100 and the display apparatus 1 are in a non-display state. The followings describe in detail on how the display apparatus changes from a non-display state to a display state.

When an external force is being applied on the containment structure 21, the containment structure 21 can bring the transflective device 5 in motion. That is, the transflective device 5 may rotate with respect to the containment structure 21 through the first connecting mechanism 3, and the transflective device 5 can also rotate with respect to the supporting member 22 through the moveable connecting mechanism 4. Thus, a space can be formed between the containment structure 21 and the first surface 53 of the transflective device 5, and a space can be also formed between the supporting member 22 and the second surface 54 of the transflective device 5.

When the display screen 71 of the display apparatus 1 contained in the containment structure 21 forms a 45-degree angle with respect to the first surface 53 of the transflective device 5, and the second surface 54 of the transflective device 5 forms a 45-degree angle with respect to the surface 221 of the supporting member 22, the generated virtual image in the space defined behind the second surface 54 may be the same size as the image displayed on the display apparatus 1. In certain embodiments, when the display system 100 is in the display state (as in FIG. 23), the containment structure 21 is parallel to the supporting member 22, and the transflective device 5 forms two respective acute angles with the containment structure 21 and the supporting member 22. Thus, when the display system 100 is in the display state, the display apparatus is in a normal "Z" shape or a normal approximate "Z" shape.

When a viewer views the display apparatus, the containment structure 21 is in front of the supporting member 22. Thus, the viewer's visual experience on the virtual image is not limited by the display apparatus 1 and thus is not affected by lights of display images of the display apparatus 1.

Further, the containment structure 21 and the supporting member 22 are in relatively regular cubic shapes, and the "Z" shaped structure makes the display apparatus more stable and with a desired appearance. Obviously, when the transflective device 5 connects to the containment structure 21 and the supporting member 22 from another symmetrical direction, the display apparatus can be in a reverse "Z" shape or a reverse approximate "Z" shape. Similarly, when the packaging box is opened, it can be in a reverse "Z" shape or a reverse approximate "Z" shape.

Further, the display system 100 can also include a viewing angle adjusting mechanism 6. The viewing angle adjusting mechanism 6 may be disposed on the supporting member 22. The supporting member 22 may include a first portion 22A and a second portion 22B, and the first portion 22A and the second portion 22B are coupled together to form a box body. The connecting end 222 of the supporting member 22 and the connecting plane 221 are disposed on the first portion 22A, and the second surface 54 of the transflective device 5 forms an acute angle with the connecting plane 221 on the first portion 22a of the supporting member 22.

In certain embodiments, the viewing angle adjusting mechanism 6 is disposed on the mating surface of the first portion 22A and the second portion 22B. The viewing angle adjusting mechanism 6 includes, on each side, a slider 61 disposed on the first portion 22A, a corresponding groove 62 matching the slider disposed on the second portion 22B, and a positioning structure 63 disposed in the groove 62. The positioning mechanism 63 may include a positioning steel ball (not labeled) and an elastic member (not shown) fixing the positioning steel ball on the bottom of the groove 62. In certain embodiments, the elastic member is a spring.

Thus, the viewing angle of the display system 100 can be adjusted through adjusting the viewing angle adjusting mechanism 6. More specifically, by maneuvering the first portion 22A or the second portion 22B of the supporting member 22, the first portion 22A can slide a certain distance along the groove 62 with respect to the second portion 22B, thereby changing the viewing angle. Of course, other structures can also be used for the viewing angle adjusting mechanism 6. For example, the viewing angle adjusting mechanism 6 may be a moveable adjusting structure moveably connected to the bottom of the supporting member, such that the moveable adjusting structure can be maneuvered to cause the supporting member 22, the transflective device 5, and the containment structure 21 to rotate with respect to the viewing angle adjusting mechanism 6, while keeping the relative positions among the supporting member 22, the transflective device 5, and the containment structure 21 fixed. Thus, the viewing angle can be adjusted without affecting the virtual image's imaging space.

Figure 26:
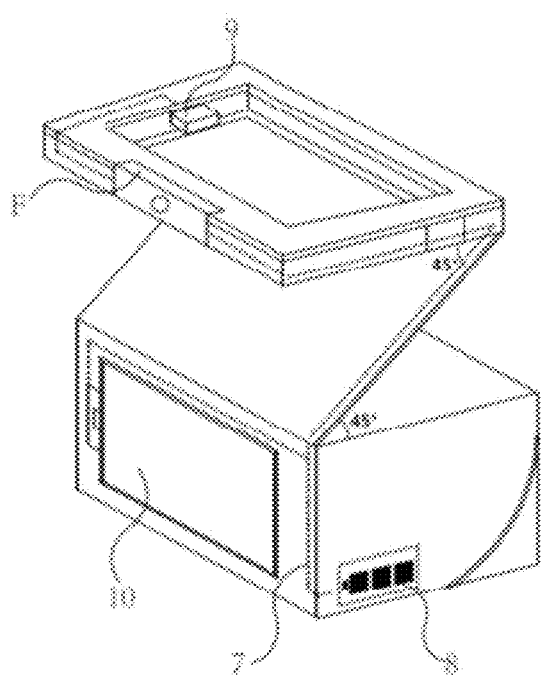
FIG. 26 illustrates an exemplary display system with additional function units consistent with the disclosed embodiments.
Figure 27:
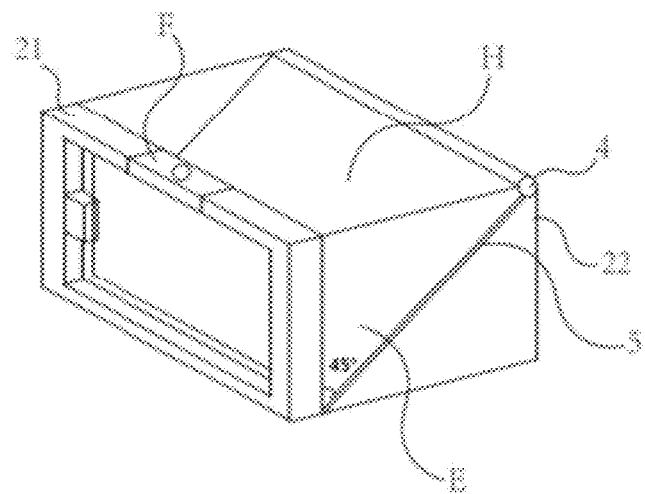
FIGS. 27-30 illustrate another exemplary display system consistent with the disclosed embodiments.
Figure 28:
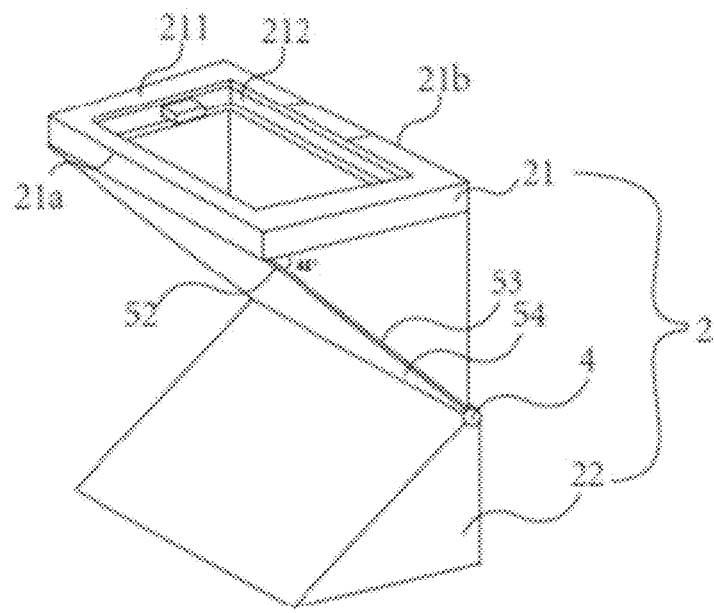
Figure 29:
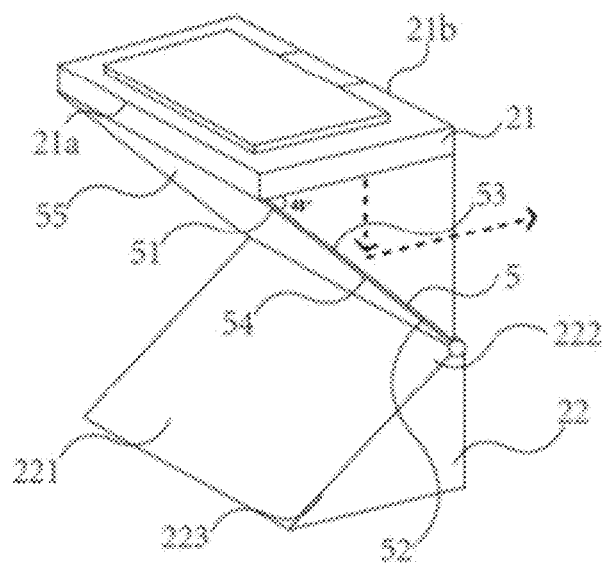
Figure 30:
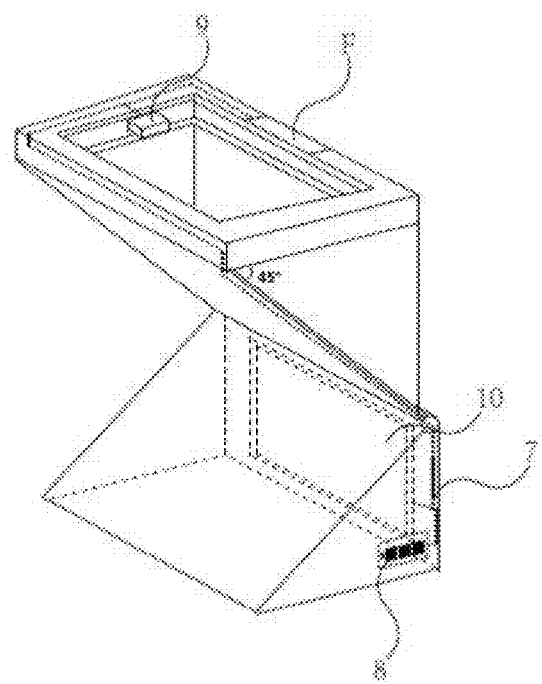
Figure 31:
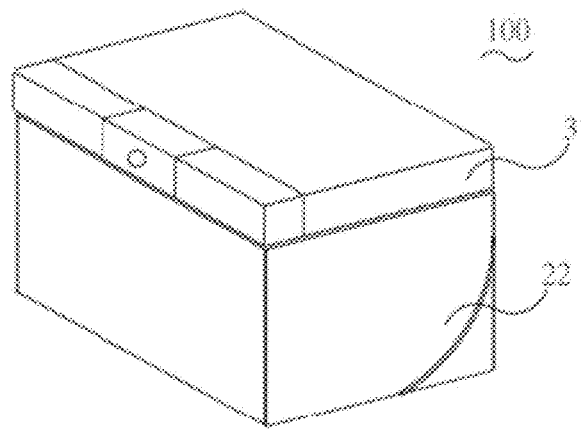
FIGS. 31-34 illustrate another exemplary display system consistent with the disclosed embodiments.
Figure 32:
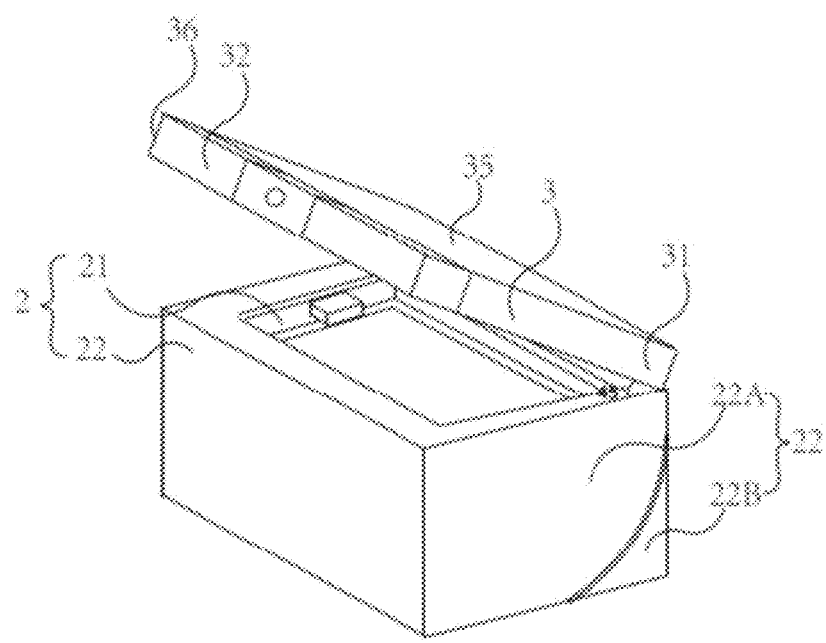
Figure 33:
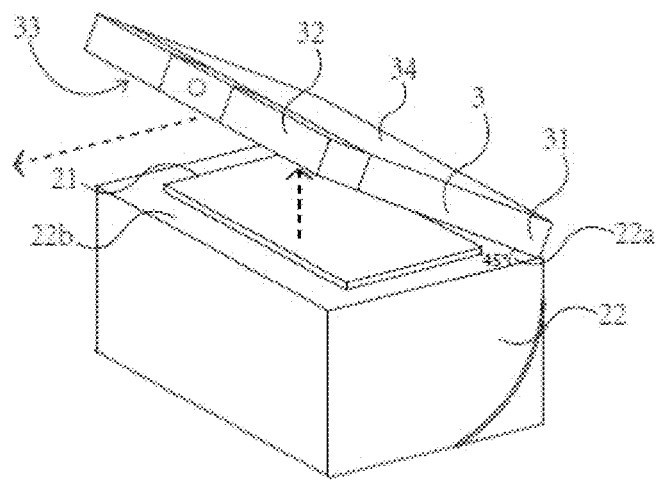
Figure 34:
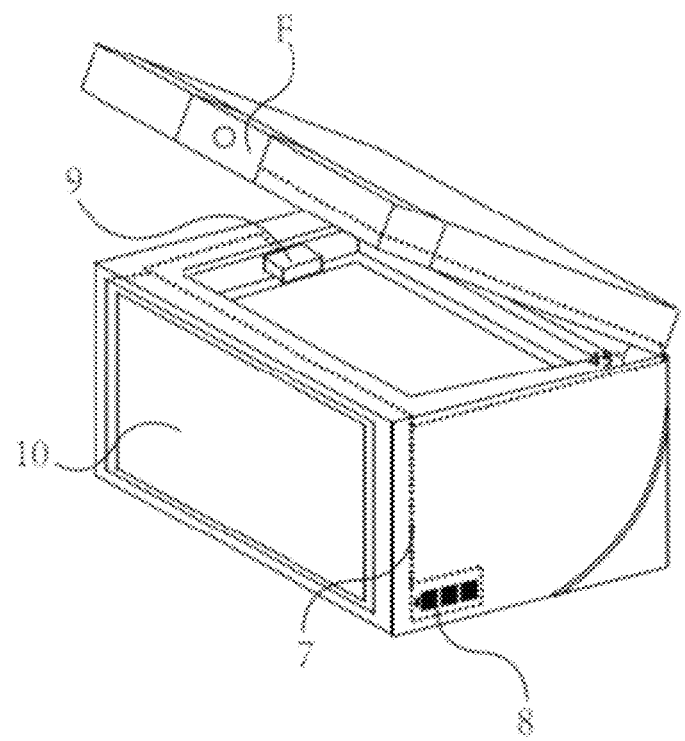

Further, as shown in FIG. 26, the display system 100 may also include additional function units. The additional function units may include a circuit connecting unit 7, a power supply unit 8, and a communication interface unit 9.

The circuit connecting unit 7 may include a pressing circuit switch (not shown) and connection wires (not labeled), and the pressing circuit switch may be disposed on the moveable connecting mechanism 4 and/or the first connecting mechanism 3. The power supply unit 8 is coupled to the communication interface unit 9 through the circuit connecting unit 7, such that power can be applied to the display apparatus 1 when needed. When the containment structure 21 forms a predetermined angle with the first surface 53 of the transflective device 5, and the second surface 54 of the transflective device 5 forms a predetermined angle with the connecting plane 221 of the supporting member 22, the pressing circuit switch is turned on, and the communication interface unit 9 and the power supply unit 8 are connected. In certain embodiments, the communication module 9 is a USB interface unit or other communication units, such as a Bluetooth unit.

Further, the display system 100 may include a control member 10 disposed on the supporting member 22. The control member 10 may be a touch control structure, including a control circuit unit (not shown) and a display screen (not labeled). The touch control structure is electrically coupled to the power supply unit 8 and the USB interface unit through the circuit connecting unit 7. The touch control structure may be rotationally embedded onto the surface of the supporting member 22 through a moveable connecting mechanism (not labeled), such that the display screen of touch control structure faces outside when the touch control structure rotates 180 degrees and, when the touch control structure rotates another 180 degrees, the display screen faces inside and supports internal structures, protecting the display screen from being damaged. Alternatively, the moveable connecting mechanism may be omitted, and the touch control structure is directly embedded onto the surface of the supporting member. The surface of the display screen of the touch control structure may be lower than the surface of the supporting member such that the display screen may be protected. In addition, the control structure may also be a key-pressing control structure having one or more keys. The circuit connecting unit can set certain functional circuit units corresponding to the key pressing of the key-pressing control structure to achieve appropriate function control.

Further, as shown in FIG. 26, the additional functional units of the display system 100 may also include a camera unit F. The camera unit F may be disposed on the free end 21b of the containment structure 21. The camera unit F may be coupled to the USB interface unit and the display apparatus 1 through the circuit connecting unit 7, and also coupled to the power supply unit 8 through the circuit connecting unit 7. Thus, the camera unit F can capture an image and send the captured image to the display apparatus 1, and the display apparatus 1 can then display the image, with the corresponding virtual image formed in the space behind the second surface 54 of the transflective device 5.

The display apparatus 1 may further include an image processing unit. The camera unit F can capture the image information of human face or human eyes of the viewer and send the information to the display apparatus 1, and the image processing unit of the display apparatus can accordingly adjust the viewing angle of the image displayed on the display apparatus. The image on the display apparatus can be automatically changed with the change of the viewing angle.

FIGS. 27-30 illustrate another exemplary display system consistent with the disclosed embodiments. As shown in FIGS. 27-30, the display system 100 may include a display apparatus 1 and a packaging box (not labeled). The display apparatus 1 may have a display surface (not shown). The packaging box includes packaging body 2, a first connecting mechanism (not shown), a moveable connecting mechanism 4, and a transflective device 5.

The packaging body 2 may include a containment structure 21 and a supporting member 22. The containment structure 21 is configured to house the display apparatus 1 and may include a connecting end 21a and a free end 21b opposite to the connecting end 21a. The transflective device 5 may include a first end 51 and a second end 52 opposite to the first end 51, and a first surface 53 and a second surface 54 opposite to the first surface 53. The first surface 53 faces the containment structure 21, and the second face 54 faces the supporting member 22.

The first end 51 of the transflective device 5 is coupled to the connecting end 21a of the containment structure 21 through the first connecting mechanism. The second end 52 of the transflective device 5 is moveably coupled to the supporting member 22 through the moveable connecting mechanism 4. When the display system 100 is in a display state, an image displayed by the display apparatus 1 passes through the transflective device 5 to form a virtual image in a space formed behind the transflective device 5.

The containment structure 21 is in a cubic shape and includes a hollow frame 211. The frame 211 forms a containing space 212 for housing the display apparatus 1. The containing space 212 matches the display apparatus 1. The shapes and structures of the containment structure 21 are not limited, as long as the containment structure 21 can accommodate the display apparatus 1 and expose the display screen 71 of the display apparatus 1 which faces the transflective device 5, such that the light of the displayed image on the display apparatus 1 can pass through the transflective device 5 to form a virtual image in the space formed behind the second surface 54 of the transflective device 5.

The display system 100 may also include a covering member E. The covering member E can be coupled together with the containment structure 21 and the transflective device 5 to form a chamber H. The chamber H may be a closed chamber, or may be an open chamber with the opening facing the first surface 53 of the transflective device 5. Further, the covering member E may be made of transparent material.

The supporting member 22 may be a hollow triangular prism or cone, and the supporting member 22 can be used for housing other parts or accessories of the display system 100. The supporting member 22 may include a connecting plane 221, a connecting end 222, and a free end 223 opposite to the connecting end 222.

The connecting plane 221 is disposed between the connecting end 222 and the free end 223. The second surface 54 of the transflective device 5 faces the connecting plane 221. Further, the free end 21b of the containment structure 21 and the connecting end 222 of the supporting member 22 are on the same side, and the connecting end 21a of the containment structure 21 and the free end 223 of the supporting member 22 are on the same side. The containment structure 21 can be parallel to the supporting member 22.

The supporting member 22 may further include a light-absorbing layer (not shown). The light-absorbing layer is disposed on the surface of the supporting member 22 on the side of the second surface 54 of the transflective device 5 (e.g., the connecting plane 221). The light-absorbing layer can absorb the light passing through the transflective device 5 when the image is displayed, so as to prevent the passing light from being reflected back, thereby affecting the contrast and brightness of the virtual image and the visual experience.

The first connecting mechanism may be a fixed connecting mechanism, i.e., the connecting end 21a of the containment structure 21 is fixedly coupled to the transflective device 5 through the fixed connecting mechanism, and the display surface of the display apparatus 1 housed in the containment structure 21 forms a certain angle with the first surface 53 of the transflective device 5. Particularly, the angle may be an acute angle, from 30 degrees to 60 degrees. In certain embodiments, the angle is approximately 45 degrees. The fixed connecting mechanism may be any fixed structure, such as engaging fixed structure.

The moveable connecting mechanism 4 and the transflective device 5 may be similar to the ones previously described, the details of which are omitted herein.

In operation, under an external force, the containment structure 21 can bring the transflective device 5 to rotate against the supporting member 22. That is, the transflective device 5 may rotate with respect to the supporting member 22 through the moveable connecting mechanism 4. Thus, a space can be formed between the containment structure 21 and the first surface 53 of the transflective device 5, and a space is also formed between the supporting member 22 and the second surface 54 of the transflective device 5.

When the display screen 71 of the display apparatus 1 contained in the containment structure 21 forms a 45-degree angle with respect to the first surface 53 of the transflective device 5, and the second surface 54 of the transflective device 5 forms a 45-degree angle with respect to the surface 221 of the supporting member 22, the generated virtual image in the space formed behind the second surface 54 may be the same size as the image displayed on the display apparatus 1. The containment structure 21 may be in a cubic shape, and the supporting member 22 may be a triangular cone shape.

In certain embodiments, when the display system 100 is in the display state, the containment structure 21 housing the display apparatus 1 is located above the supporting member 22, the image light from the display screen of the display apparatus 1 can directly enter the transflective device 5 and generate a virtual image in the space formed behind the second surface 54 of the transflective device 5. Thus, the viewer's visual experience on the virtual image is not affected by the light from an image displayed by the display apparatus 1 (e.g., the contrast and brightness of the virtual image), such that the display system 100 is stable and with a desired appearance.

Further, a viewing angle adjusting structure of the display system 100 can be implemented by the moveable connecting mechanism 4. The viewing angle can be adjusted by rotating the transflective device 5 with respect to the supporting member 22. Alternatively, a viewing angle adjusting mechanism can be disposed at the bottom of the supporting member 22, such that the moveable adjusting structure can be maneuvered to cause the supporting member 22, the transflective device 5, and the containment structure 21 to rotate with respect to the viewing angle adjusting mechanism, while keeping the relative positions among the supporting member 22, the transflective device 5, and the containment structure 21 fixed. Thus, the viewing angle can be adjusted without affecting the virtual image's imaging space. Similar to the previously disclosed embodiments, the display system 100 may include additional function units, such as a camera unit, the details of which are omitted herein.

FIGS. 31-34 illustrate another exemplary display system consistent with the disclosed embodiments. As shown in FIGS. 31-34, the display system 100 may include a display apparatus 1 and a packaging box (not labeled). The display apparatus 1 may have a display surface (not shown). The packaging box includes packaging body 2, a transflective device 3, and a moveable connecting mechanism (not shown).

The packaging body 2 may include containment structure 21 and the supporting member 22. The containment structure 21 is configured to house the display apparatus 1. The transflective device 3 may include a connecting end 31 and a free end 32 opposite to the connecting end 31, and a first surface 33 and a second surface 34 opposite to the first surface 33. The first surface 33 faces the containment structure 21.

The connecting end 31 of the transflective device 3 is moveably coupled to the supporting member 22 through the moveable connecting mechanism. When the display system 100 is in a display state, a virtual image of the image displayed by the display apparatus 1 can be formed in a space formed behind the second surface 34 of the transflective device 3.

The supporting member 22 may be a hollow box body, and the supporting member 22 has at least one open groove on the side. The containment structure 21 is provided on the groove of the supporting member 22, such that the image light from the display screen 71 of the display apparatus 1 can reach the transflective device 3. The supporting member 22 includes a connecting end 22a and a free end 22b opposite to the connecting end 22a, and the connecting end 31 of the transflective device 3 is coupled to the connecting end 22a of the supporting member 22 through the moveable connecting mechanism. When the transflective device 3 folds and covers the supporting member 22, the free end 32 of the transflective device 3 and the free end 22b of the supporting member 22 are on the same side.

The transflective device 3 may include a transflective member 35 and a fixing member 36 for fixing the transflective member 35. In certain embodiments, the fixing member 36 is a fixing member made of a transparent material.

The transflective member 35 is a device that has a surface coating and whose transmissive/reflecting ratio can be adjusted according to the ambient light. With a power supply, the transflective member 35 can also be a liquid crystal glass device (also known as electronically-controlled liquid crystal glass). When power is applied, the transmissive ratio can be adjusted by adjusting the voltage of the device to adapt to changing light environment.

The moveable connecting mechanism 4 may be similar to the ones previously described, the details of which are omitted herein. Other structures may also be used for the moveable connecting mechanism, including other rotary positioning structures, such hinge structures.

In operation, under an external force, the transflective device 3 rotates against the supporting member 22 to cause the display screen of the display apparatus 1 housed in the containment structure 21 to form a predetermined angle with the first surface 33 of the transflective device 3. Thus, a virtual image of the image displayed by the display apparatus 1 can be generated in the space formed behind the second surface 34 of the transflective device 3. For example, a predetermined angle may be approximately 45 degrees. When there is no need for display, the transflective device 3 folds and covers the containment structure 21.

Further, the display system 100 can also include a viewing angle adjusting mechanism 6, which may be similar to those described above. Alternatively, the viewing angle adjusting mechanism may be a moveable adjusting structure disposed at the bottom of the supporting member 22, such that the moveable adjusting structure can be maneuvered to cause the supporting member 22, the transflective device 3, and the containment structure 21 to rotate with respect to the viewing angle adjusting mechanism, while keeping the relative positions among the supporting member 22, the transflective device 3, and the containment structure 21 fixed. Thus, the viewing angle can be adjusted without affecting the virtual image's imaging space.

Similar to the previously disclosed embodiments, the display system 100 may include additional function units, the details of which are omitted herein.

The above described embodiments are only for illustrative purposes. It should be noted that those skilled in the art, without departing from the principles of the present disclosure, may make certain improvements and modifications, and these improvements and modifications should also be considered within the scope of the disclosure.

Other applications, advantages, alternations, modifications, or equivalents to the disclosed embodiments are obvious to those skilled in the art.

What is claimed is:

1. A display apparatus, comprising:
a supporting member having a containment structure configured to contain a two-dimensional (2D) display terminal for displaying a parallax image;
a transflective device configured to face a display surface of the 2D display terminal and to transmit and reflect light from the displayed parallax image; and
a connecting mechanism configured to connect the supporting member with the transflective device,
wherein:
the containment structure includes an installation part configured to install a light-splitting device;
an area of the light-splitting device is greater than or equal to an area of the display surface of the 2D display terminal; and
a three-dimensional (3D) image to be viewed is formed after the light from the parallax image displayed by the 2D display terminal is separated by the light-splitting device and transmitted and reflected by the transflective device.

2. The apparatus according to claim 1, wherein:
the supporting member includes an upper supporting member and a lower supporting member;
the containment structure is disposed on the upper supporting member;
the connecting mechanism is configured to connect the upper supporting member and the lower supporting member;
the transflective device is disposed between the upper supporting member and the lower supporting member; and
an angle between the display surface of the 2D display terminal and a facing surface of the transflective device is an acute angle, wherein the facing surface of the transflective device is the surface of the transflective device facing the display surface of the 2D display terminal.

3. The apparatus according to claim 2, wherein:
the connecting mechanism includes a first connecting unit and a second connecting unit that are set face to face;
the first connecting unit, the second connecting unit, the upper supporting member and the lower supporting member together form a containing space for containing the transflective device;
the upper supporting member includes a first end and a second end facing the first end;
the lower supporting member includes a first end and a second end facing the first end; and
the first end of the upper supporting member and the first end of the lower supporting member are on the same side.

4. The apparatus according to claim 3, wherein connecting modes between the connecting mechanism and the supporting member include one of the following:
one end of the first connecting unit and one end of the second connecting unit connect respectively to the first end of the upper supporting member, while the other end of the first connecting unit and the other end of the second connecting unit connect respectively to the second end of the lower supporting member; and
one end of the first connecting unit and one end of the second connecting unit connect respectively to the second end of the upper supporting member, while the other end of the first connecting unit and the other end of the second connecting unit connect respectively to the first end of the lower supporting member.

5. The apparatus according to claim 2, wherein:
the connecting mechanism includes a supporting and connecting unit;
the upper supporting member and the lower supporting member together form a containing space for containing the transflective device;
the upper supporting member includes a first end and a second end facing the first end;
the lower supporting member includes a first end and a second end facing the first end; and
the first end of the upper supporting member and the first end of the lower supporting member are on the same side.

6. The apparatus according to claim 5, wherein:
when one end of the supporting and connecting unit connects to the first end of the upper supporting member, the other end of the supporting and connecting unit connects to the first end of the lower supporting member; and
when one end of the supporting and connecting unit connects to the second end of the upper supporting member, the other end of the supporting and connecting unit connects to the second end of the lower supporting member.

7. The apparatus according to claim 6, wherein:
when the containment structure has a side wall and a first opening portion, a bayonet matching with a holding groove of the 2D display terminal is disposed on the side wall, such that the 2D display terminal is clamped in the containment structure through the first opening portion.

8. The apparatus according to claim 2, wherein:
the angle between the display surface of the 2D display terminal and the facing surface of the transflective device is 45 degrees.

9. The apparatus according to claim 1, wherein:
the light-splitting device is one of a slit grating and a lens grating, wherein the slit grating includes a liquid crystal slit grating, and the lens grating includes a liquid crystal lens grating.

10. The apparatus according to claim 9, further including:
a liquid crystal grating control module configured to turn on one of the liquid crystal slit grating and the liquid crystal lens grating.

11. The apparatus according to claim 10, further including:
a sound control module configured to synchronously play audio of the parallax image displayed on the 2D display terminal.

12. The apparatus according to claim 9, further including:
a first camera module configured to obtain image information of a viewer; and
a first transmission module configured to transmit the image information obtained by the first camera module to the 2D display terminal such that the 2D display terminal calculates position information of the viewer based on the received image information, and calculates layout parameters based on the position information and built-in parameters of the display apparatus.

13. The apparatus according to claim 11, further including:

a second camera module configured to obtain the image information of the viewer; and a position information calculation module configured to, based on the image information obtained by the second camera module, calculate the position information of the viewer.

14. The apparatus according to claim 13, further including:

a second transmission module configured to transmit the position information calculated by the position information calculation module to the 2D display terminal, such that the 2D display terminal calculates the layout parameters based on the received position information and the built-in parameters of the display apparatus, and rearranges the parallax image.

15. The apparatus according to claim 13, further including:

a layout parameters calculation module configured to calculate the layout parameters based on the position information calculated by the position information calculation module and the built-in parameters of the display apparatus; and the second transmission module configured to transmit the layout parameters calculated by the layout parameters calculation module to the 2D display terminal.

16. The apparatus according to claim 15, further including:

a light detection module configured to detect ambient light intensity in a current environment of the display apparatus; and a third transmission module configured to transmit the ambient light intensity detected by the light detection module to the 2D display terminal, such that the 2D display terminal adjusts at least one of brightness and contrast of the parallax image as well as a gamma value of the 2D display terminal based on the received ambient light intensity.

17. The apparatus according to claim 16, further including:

a configuration information reading module configured to read a placement direction of the 2D display terminal contained in the containment structure; and a fourth transmission module configured to transmit the placement direction read by the configuration information reading module to the 2D display terminal, such that the 2D display terminal performs one of a horizontal flip operation and a vertical flip operation based on the received placement direction.

18. The apparatus according to claim 1, wherein:

the transflective device includes a transflective member and a fixing member, wherein the fixing member is configured to fix the transflective member and is made of a transparent material.

19. The apparatus according to claim 18, wherein:

the transflective member does not have a frame such that the 3D image is displayed without any frame impression.

20. A display system, comprising:

a two-dimensional (2D) display terminal for displaying a parallax image; and a display apparatus including:

a supporting member having a containment structure configured to contain the 2D display terminal for displaying the parallax image;

a transflective device configured to face a display surface of the 2D display terminal and to transmit and reflect light from the displayed parallax image; and a connecting mechanism configured to connect the supporting member with the transflective device, wherein:

the containment structure includes an installation part configured to install a light-splitting device;

an area of the light-splitting device is greater than or equal to an area of the display surface of the 2D display terminal; and a three-dimensional (3D) image to be viewed is formed after the light from the parallax image displayed by the 2D display terminal is separated by the light-splitting device and transmitted and reflected by the transflective device.

21. The system according to claim 20, wherein:

the transflective device includes a transflective part and a fixing member, wherein the fixing member is configured to fix the transflective part and is made of a transparent material.

22. The system according to claim 21, wherein:

the transflective member does not have a frame such that the 3D image is displayed without any frame impression.

* * * * *